(12) United States Patent
Rajasingham

(10) Patent No.: US 10,921,885 B2
(45) Date of Patent: Feb. 16, 2021

(54) OCCUPANT SUPPORTS AND VIRTUAL VISUALIZATION AND NAVIGATION

(71) Applicant: Arjuna Indraeswaran Rajasingham, Bethesda, MD (US)

(72) Inventor: Arjuna Indraeswaran Rajasingham, Bethesda, MD (US)

( * ) Notice: Subject to any disclaimer, the term of this patent is extended or adjusted under 35 U.S.C. 154(b) by 0 days.

(21) Appl. No.: 16/855,181

(22) Filed: Apr. 22, 2020

(65) Prior Publication Data

US 2020/0272233 A1 Aug. 27, 2020

Related U.S. Application Data

(63) Continuation-in-part of application No. 16/430,061, filed on Jun. 3, 2019, which is a continuation-in-part of application No. 16/138,998, filed on Sep. 22, 2018, and a continuation-in-part of application No. 15/878,488, filed on Jan. 24, 2018, now Pat. No. 10,780,857, said application No. 16/138,998 is a continuation-in-part of application No. 15/878,488, (Continued)

(51) Int. Cl.

| G06F 3/01 | (2006.01) |
|---|---|
| G06T 19/00 | (2011.01) |
| G06T 15/20 | (2011.01) |
| H04N 7/18 | (2006.01) |
| G02B 27/01 | (2006.01) |
| G06F 3/0484 | (2013.01) |
| G06F 3/0481 | (2013.01) |
| H04N 13/218 | (2018.01) |
| H04N 13/243 | (2018.01) |
| H04N 13/344 | (2018.01) |
| H04L 29/06 | (2006.01) |
| H04N 13/221 | (2018.01) |
| H04R 1/08 | (2006.01) |
| H04N 5/232 | (2006.01) |

(52) U.S. Cl.
CPC ........... *G06F 3/013* (2013.01); *G02B 27/017* (2013.01); *G06F 3/04815* (2013.01); *G06F 3/04842* (2013.01); *G06T 15/205* (2013.01); *G06T 19/003* (2013.01); *H04L 67/38* (2013.01); *H04N 5/23238* (2013.01); *H04N 7/183* (2013.01); *H04N 7/185* (2013.01); *H04N 13/218* (2018.05); *H04N 13/221* (2018.05); *H04N 13/243* (2018.05); *H04N 13/344* (2018.05); *H04R 1/08* (2013.01); *G02B 2027/0138* (2013.01); *G02B 2027/0178* (2013.01)

(58) Field of Classification Search
CPC .. G06F 3/013; G06F 3/04815; G06F 3/04842; G06F 3/011; G06F 3/0346; H04N 13/344; H04N 13/221; H04N 13/218; H04N 13/243; H04N 5/23238; H04N 7/183; H04N 7/185; H04N 5/232; G02B 27/017; G02B 2027/0138; G02B 2027/0178; G06T 15/205; G06T 19/003; G06T 19/00; H04L 67/38; H04R 1/08
See application file for complete search history.

(56) References Cited

U.S. PATENT DOCUMENTS

| 9,836,885 B1 * | 12/2017 | Eraker | G06Q 30/0623 |
| 2003/0132939 A1 * | 7/2003 | Moshe | G06T 15/00 345/474 |

(Continued)

*Primary Examiner* — Xilin Guo

(57) ABSTRACT

Apparatus and method for using light fields for virtual visualization and virtual navigation.

20 Claims, 36 Drawing Sheets

Related U.S. Application Data said application No. 16/430,061 is a continuation-in-part of application No. 15/872,108, filed on Jan. 16, 2018, said application No. 16/138,998 is a continuation-in-part of application No. 15/872,108, said application No. 16/430,061 is a continuation-in-part of application No. PCT/US2017/064626, filed on Dec. 5, 2017, said application No. 16/138,998 is a continuation-in-part of application No. 15/203,882, filed on Jul. 7, 2016, now Pat. No. 10,703,483, said application No. 15/872,108 is a continuation-in-part of application No. 15/203,882, said application No. 16/430,061 is a continuation-in-part of application No. 15/203,882, said application No. 15/872,108 is a continuation-in-part of application No. 15/143,168, filed on Apr. 29, 2016, now Pat. No. 10,556,523, said application No. 16/430,061 is a continuation-in-part of application No. 15/143,168, said application No. 16/138,998 is a continuation-in-part of application No. 15/143,168, said application No. 15/827,108 is a continuation-in-part of application No. 14/903,573, filed as application No. PCT/US2014/045727 on Jul. 8, 2014, now Pat. No. 10,173,779, said application No. 15/203,882 is a continuation-in-part of application No. 14/852,593, filed on Sep. 13, 2015, now Pat. No. 10,144,514, said application No. 15/143,168 is a continuation-in-part of application No. 14/848,575, filed on Sep. 9, 2015, now Pat. No. 9,669,739, said application No. 15/878,488 is a continuation-in-part of application No. 14/726,170, filed on May 29, 2015, now abandoned, said application No. PCT/US2017/064626 is a continuation-in-part of application No. 14/708,584, filed on May 11, 2015, now Pat. No. 10,120,440, said application No. 15/878,488 is a continuation-in-part of application No. 14/600,932, filed on Jan. 20, 2015, now Pat. No. 9,902,298, said application No. 15/143,168 is a continuation-in-part of application No. 14/461,395, filed on Aug. 16, 2014, now Pat. No. 9,440,563, said application No. 15/203,882 is a continuation-in-part of application No. 14/375,673, filed as application No. PCT/US2013/000024 on Jan. 31, 2013, now Pat. No. 9,868,416, said application No. 15/203,882 is a continuation-in-part of application No. 14/210,413, filed on Mar. 13, 2014, now Pat. No. 9,428,088, said application No. 15/143,168 is a continuation-in-part of application No. 14/210,413, said application No. PCT/US2017/064626 is a continuation-in-part of application No. 14/203,088, filed on Mar. 10, 2014, now Pat. No. 10,423,295, said application No. 16/430,061 is a continuation-in-part of application No. 14/203,088, said application No. 15/143,168 is a continuation-in-part of application No. 13/820,510, filed as application No. PCT/US2011/001547 on Sep. 6, 2011, now Pat. No. 9,358,908, said application No. 14/203,088 is a continuation-in-part of application No. 13/694,996, filed on Jan. 24, 2013, said application No. 16/430,061 is a continuation-in-part of application No. 13/694,996, said application No. 14/726,170 is a continuation-in-part of application No. 13/507,149, filed on Jun. 9, 2012, now Pat. No. 9,150,127, said application No. 14/600,932 is a continuation-in-part of application No. 13/507,149, said application No. 13/507,149 is a continuation-in-part of application No. 13/138,183, filed as application No. PCT/US2010/000237 on Jan. 28, 2010, now Pat. No. 9,174,555, said application No. 14/852,593 is a continuation-in-part of application No. 13/138,183, said application No. 14/848,575 is a continuation-in-part of application No. 13/138,183, said application No. 14/210,413 is a continuation-in-part of application No. 12/735,146, filed as application No. PCT/US2009/000342 on Jan. 21, 2009, now Pat. No. 8,763,954, said application No. 14/461,395 is a continuation of application No. 12/451,317, filed as application No. PCT/US2008/005810 on May 7, 2008, now Pat. No. 8,864,229, said application No. 14/203,088 is a continuation-in-part of application No. 11/730,161, filed on Mar. 29, 2007, now Pat. No. 9,063,633, said application No. 14/708,584 is a continuation of application No. 11/730,161, said application No. PCT/US2010/000237 is a continuation-in-part of application No. 11/639,088, filed on Dec. 14, 2006, now Pat. No. 8,251,444, said application No. 13/507,149 is a continuation-in-part of application No. 11/639,088, said application No. 13/694,996 is a continuation-in-part of application No. 10/790,151, filed on Mar. 2, 2004, now Pat. No. 8,386,301.

(60) Provisional application No. 62/480,071, filed on Mar. 31, 2017, provisional application No. 62/430,910, filed on Dec. 6, 2016, provisional application No. 61/961,367, filed on Oct. 12, 2013, provisional application No. 61/961,092, filed on Oct. 4, 2013, provisional application No. 61/959,598, filed on Aug. 28, 2013, provisional application No. 61/957,635, filed on Jul. 8, 2013, provisional application No. 61/848,724, filed on Jan. 10, 2013, provisional application No. 61/797,639, filed on Dec. 12, 2012, provisional application No. 61/797,175, filed on Dec. 1, 2012, provisional application No. 61/744,431, filed on Sep. 26, 2012, provisional application No. 61/688,855, filed on May 23, 2012, provisional application No. 61/688,591, filed on May 17, 2012, provisional application No. 61/686,316, filed on Apr. 3, 2012, provisional application No. 61/685,537, filed on Mar. 20, 2012, provisional application No. 61/632,797, filed on Jan. 31, 2012, provisional application No. 61/465,160, filed on Mar. 15, 2011, provisional application No. 61/460,266, filed on Dec. 29, 2010, provisional application No. 61/459,689, filed on Dec. 16, 2010, provisional application No. 61/458,997, filed on Dec. 3, 2010, provisional application No. 61/404,335, filed on Oct. 1, 2010, provisional application No. 61/402,751, filed on Sep. 3, 2010, provisional application No. 61/276,298, filed on Sep. 9, 2009, provisional application No. 61/270,808, filed on Jul. 14, 2009, provisional application No. 61/215,559, filed on May 7, 2009, provisional application No. 61/214,672, filed on Apr. 27, 2009, provisional application No. 61/211,191, filed on Mar. 27, 2009, provisional application No. 61/208,445, filed on Feb. 24, 2009, provisional application No. 61/206,205, filed on Jan. 28, 2009, provisional application No. 61/198,541, filed on Nov. 6, 2008, provisional application No. 61/191,309, filed on Sep. 8, 2008, provisional application No. 61/188,175, filed on Aug. 7, 2008, provisional application No. 61/123,345, filed on Apr. 8, 2008, provisional application No. 61/072,495, filed on Mar. 31, 2008, provisional application No. 61/072,241, filed on Mar. 28, 2008, provisional application No. 61/066,372, filed on Feb. 20, 2008, provisional application No. 61/062,002, filed on Jan. 23, 2008, provisional application No. 61/006,074, filed on Dec. 17, 2007, provisional application No. 60/960,620, filed on Oct. 5, 2007, provisional application No. 60/960,067, filed on Sep. 13, 2007, provisional application No. 60/962,077, filed on Jul. 26, 2007, provisional application No. 60/928,040, filed on May 7, 2007, provisional application No. 60/849,685, filed on Oct. 5, 2006, provisional application No. 60/848,804, filed on Sep. 29, 2006, provisional application No. 60/787,444, filed on Mar. 30, 2006, provisional application No. 60/751,305, filed on Dec. 19, 2005, provisional application No. 60/450,682, filed on Mar. 3, 2003.

(56) References Cited

U.S. PATENT DOCUMENTS

| | | | |
|---|---|---|---|
| 2006/0256008 A1* | 11/2006 | Rosenberg | G01S 5/0072 342/367 |
| 2007/0038945 A1* | 2/2007 | Miller | G06F 16/954 715/760 |
| 2014/0104392 A1* | 4/2014 | Thorn | H04N 13/232 348/46 |
| 2017/0092109 A1* | 3/2017 | Trundle | H04B 7/18504 |
| 2018/0199025 A1* | 7/2018 | Holzer | H04N 5/2624 |

* cited by examiner

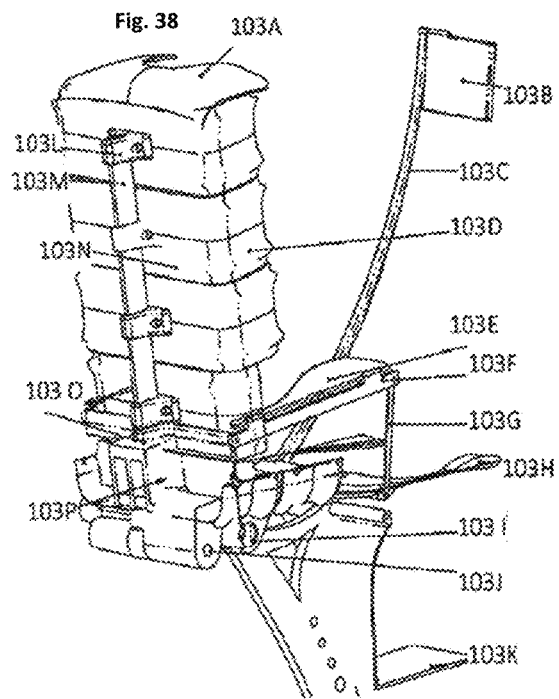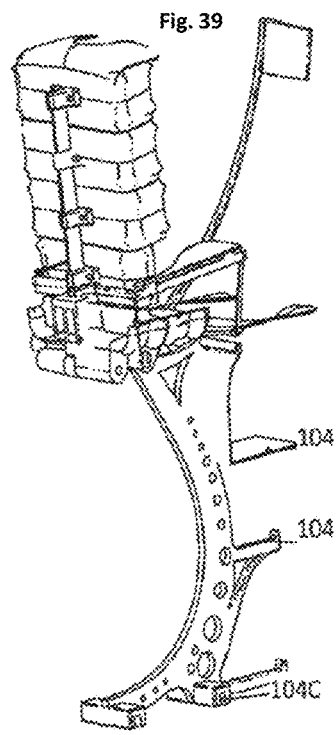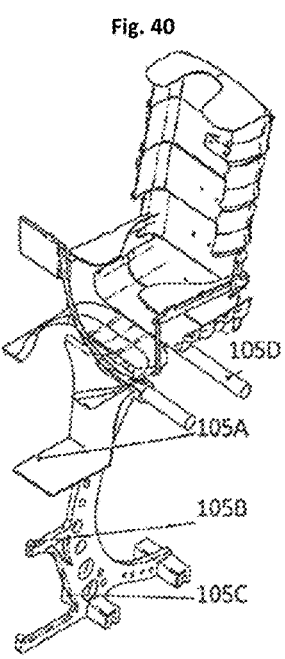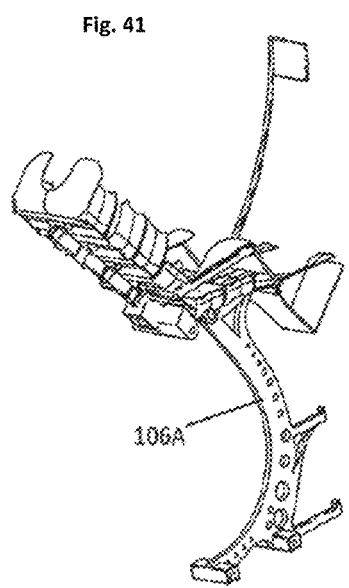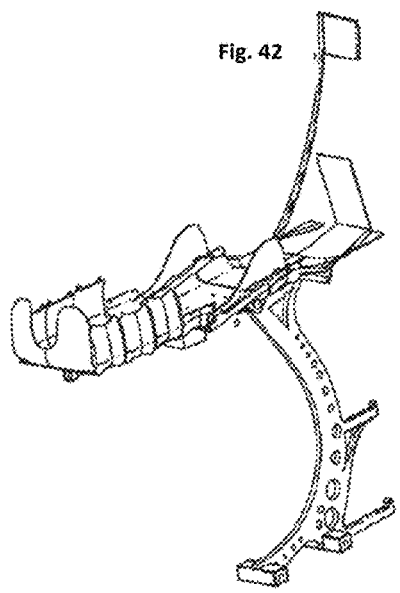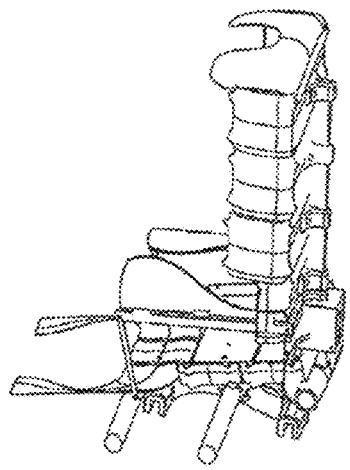

OCCUPANT SUPPORTS AND VIRTUAL VISUALIZATION AND NAVIGATION

RELATED APPLICATIONS PCT

This application claims hereby claims priority from and incorporates herein by reference the following applications.

| Referenced Application | Relationship | Priority and incorporation hereby by reference claimed to | Filing date |
|---|---|---|---|
| This application is | Continuation in part of | 16/430,061 | 2019 Jun. 3 |
| 16/430,061 | Continuation in part of | PCT/US2017/064626 | 2017 Dec. 6 |
| PCT/US2017/064626 | Claims benefit of provisional | 62/430,910 | 2016 Dec. 6 |
| PCT/US2017/064626 | Claims benefit of provisional | 62/480,071 | 2017 Mar. 31 |
| PCT/US2017/064626 | Continuation in part of | 14/203,088 | 2014 Mar. 10 |
| 14/203,088 | Continuation in part of | 13/694,996 | 2013 Jan. 24 |
| 13/694,996 | Continuation in part of | 10/790,151 | 2004 Mar. 2 |
| 10/790,151 | Claims benefit of provisional | 60/450,682 | 2003 Mar. 3 |
| 14/203,088 | Continuation in part of | 11/730,161 | 2007 Mar. 29 |
| 11/730,161 | Claims benefit of provisional | 60/787,444 | 2006 Mar. 30 |
| PCT/US2017/064626 | Continuation in part of | 14/708,584 | 2015 May 11 |
| 14/708,584 | Continuation of | 11/730,161 | 2007 Mar. 29 |
| 11/730,161 | Claims benefit of provisional | 60/787,444 | 2006 Mar. 30 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/203,882 | 2016 Jul. 7 |
| 15/203,882 | Continuation in part of | 14/375,673 | 2014 Jul. 30 |
| 14/375,673 | a 371 of international | PCT/US2013/000024 | 2013 Jan. 31 |
| PCT/US2013/000024 | Claims benefit of provisional | 61/632,797 | 2012 Jan. 31 |
| PCT/US2013/000024 | Claims benefit of provisional | 61/685,537 | 2012 Mar. 20 |
| PCT/US2013/000024 | Claims benefit of provisional | 61/686,316 | 2012 Apr. 3 |
| PCT/US2013/000024 | Claims benefit of provisional | 61/688,591 | 2012 May 17 |
| PCT/US2013/000024 | Claims benefit of provisional | 61/688,855 | 2012 May 23 |
| PCT/US2013/000024 | Claims benefit of provisional | 61/744,431 | 2012 Sep. 26 |
| PCT/US2013/000024 | Claims benefit of provisional | 61/797,175 | 2012 Dec. 1 |
| PCT/US2013/000024 | Claims benefit of provisional | 61/797,639 | 2012 Dec. 12 |
| PCT/US2013/000024 | Claims benefit of provisional | 61/848,724 | 2013 Jan. 10 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/872,108 | 2018 Jan. 16 |
| 15/872,108 | Continuation in part of | 15/143,168 | 2016 Apr. 29 |
| 15/143,168 | Continuation in part of | 13/820,510 | 2013 Mar. 2 |
| 13/820,510 | a 371 of international | PCT/US2011/001547 | 2011 Sep. 6 |
| PCT/US2011/001547 | Claims benefit of provisional | 61/402,751 | 2010 Sep. 3 |
| PCT/US2011/001547 | Claims benefit of provisional | 61/404,335 | 2010 Oct. 1 |
| PCT/US2011/001547 | Claims benefit of provisional | 61/458,997 | 2010 Dec. 3 |
| PCT/US2011/001547 | Claims benefit of provisional | 61/459,689 | 2010 Dec. 16 |
| PCT/US2011/001547 | Claims benefit of provisional | 61/460,266 | 2010 Dec. 29 |
| PCT/US2011/001547 | Claims benefit of provisional | 61/465,160 | 2011 Mar. 15 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/143,168 | 2016 Apr. 29 |
| 15/143,168 | Continuation in part of | 14/461,395 | 2014 Aug. 16 |
| 14/461,395 | Continuation of | 12/451,317 | 2009 Nov. 6 |
| 12/451,317 | a 371 of international | PCT/US2008/005810 | 2008 May 7 |
| PCT/US2008/005810 | Claims benefit of provisional | 60/928,040 | 2007 May 7 |
| PCT/US2008/005810 | Claims benefit of provisional | 60/962,077 | 2007 Jul. 26 |
| PCT/US2008/005810 | Claims benefit of provisional | 60/960,067 | 2007 Sep. 13 |
| PCT/US2008/005810 | Claims benefit of provisional | 60/960,620 | 2007 Oct. 5 |
| PCT/US2008/005810 | Claims benefit of provisional | 61/006,074 | 2007 Dec. 17 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/143,168 | 2016 Apr. 29 |
| 15/143,168 | Continuation in part of | 14/210,413 | 2014 Mar. 13 |
| 14/210,413 | Continuation of | 12/735,146 | 2010 Jun. 17 |
| 12/735,146 | a 371 of international | PCT/US2009/000342 | 2009 Jan. 21 |
| PCT/US2009/000342 | Claims benefit of provisional | 61/062,002 | 2008 Jan. 23 |
| PCT/US2009/000342 | Claims benefit of provisional | 61/066,372 | 2008 Feb. 20 |
| PCT/US2009/000342 | Claims benefit of provisional | 61/072,241 | 2008 Mar. 28 |
| PCT/US2009/000342 | Claims benefit of provisional | 61/072,495 | 2008 Mar. 31 |
| PCT/US2009/000342 | Claims benefit of provisional | 61/123,345 | 2008 Apr. 8 |
| PCT/US2009/000342 | Claims benefit of provisional | 61/188,175 | 2008 Aug. 7 |
| PCT/US2009/000342 | Claims benefit of provisional | 61/191,309 | 2008 Sep. 8 |
| PCT/US2009/000342 | Claims benefit of provisional | 61/198,541 | 2008 Nov. 6 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/143,168 | 2016 Apr. 29 |
| 15/143,168 | Continuation in part of | 14/848,575 | 2015 Sep. 9 |
| 14/848,575 | Continuation in part of | 13/138,183 | 2011 Jul. 18 |

-continued

| Referenced Application | Relationship | Priority and incorporation hereby by reference claimed to | Filing date |
|---|---|---|---|
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/203,882 | 2016 Jul. 7 |
| 15/203,882 | Continuation in part of | 14/210,413 | 2014 Mar. 13 |
| 14/210,413 | Continuation of | 12/735,146 | 2010 Jun. 17 |
| 12/735,146 | a 371 of international | PCT/US2009/000342 | 2009 Jan. 21 |
| PCT/US2009/000342 | Claims benefit of provisional | 61/062,002 | 2008 Jan. 23 |
| PCT/US2009/000342 | Claims benefit of provisional | 61/066,372 | 2008 Feb. 20 |
| PCT/US2009/000342 | Claims benefit of provisional | 61/072,241 | 2008 Mar. 28 |
| PCT/US2009/000342 | Claims benefit of provisional | 61/072,495 | 2008 Mar. 31 |
| PCT/US2009/000342 | Claims benefit of provisional | 61/123,345 | 2008 Apr. 8 |
| PCT/US2009/000342 | Claims benefit of provisional | 61/188,175 | 2008 Aug. 7 |
| PCT/US2009/000342 | Claims benefit of provisional | 61/191,309 | 2008 Sep. 8 |
| PCT/US2009/000342 | Claims benefit of provisional | 61/198,541 | 2008 Nov. 6 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/872,108 | 2018 Jan. 16 |
| 15/872,108 | Continuation in part of | 14/903,573 | 2016 Jan. 07 |
| 14/903,573 | a 371 of international | PCT/US2014/045727 | 2014 Jul. 8 |
| PCT/US2014/045727 | Claims benefit of provisional | 61/957,635 | 2013 Jul. 8 |
| PCT/US2014/045727 | Claims benefit of provisional | 61/959,598 | 2013 Aug. 28 |
| PCT/US2014/045727 | Claims benefit of provisional | 61/961,092 | 2013 Oct. 04 |
| PCT/US2014/045727 | Claims benefit of provisional | 61/961,367 | 2013 Oct. 12 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/872,108 | 2018 Jan. 16 |
| 15/872,108 | Continuation in part of | 15/203,882 | 2016 Jul. 7 |
| 15/203,882 | Continuation in part of | 14/375,673 | 2014 Jul. 30 |
| 15/203,882 | Continuation in part of | 14/852,593 | 2015 Sep. 13 |
| 14/852,593 | Continuation in part of | 13/138,183 | 2011 Jul. 18 |
| 13/507,149 | Continuation in part of | 13/138,183 | 2011 Jul. 18 |
| 13/138,183 | a 371 of international | PCT/US2010/000237 | 2010 Jan. 28 |
| PCT/US2010/000237 | Claims benefit of provisional | 61/206,205 | 2009 Jan. 26 |
| PCT/US2010/000237 | Claims benefit of provisional | 61/208,445 | 2009 Feb. 24 |
| PCT/US2010/000237 | Claims benefit of provisional | 61/211,191 | 2009 Mar. 27 |
| PCT/US2010/000237 | Claims benefit of provisional | 61/214,672 | 2009 Apr. 27 |
| PCT/US2010/000237 | Claims benefit of provisional | 61/215,559 | 2009 May 7 |
| PCT/US2010/000237 | Claims benefit of provisional | 61/270,808 | 2009 Jul. 14 |
| PCT/US2010/000237 | Claims benefit of provisional | 61/276,298 | 2009 Sep. 9 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/878,488 | 2018 Jan. 24 |
| 15/878,488 | Continuation in part of | 14/726,170 | 2015 May 29 |
| 14/726,170 | Continuation in part of | 13/507,149 | 2012 Jun. 9 |
| 13/507,149 | Continuation in part of | 11/639,088 | 2006 Dec. 14 |
| This application is | Continuation in part of | 16/430,061 | 2019 Jun. 3 |
| 16/430,061 | Continuation in part of | 16/138,998 | 2018 Sep. 22 |
| 16/138,998 | Continuation in part of | 15/878,488 | 2018 Jan. 24 |
| 15/878,488 | Continuation in part of | 14/600,932 | 2015 Jan. 20 |
| 14/600,932 | Continuation in part of | 13/507,149 | 2012 Jun. 9 |
| 13/507,149 | Continuation in part of | 11/639,088 | 2006 Dec. 14 |
| 11/639,088 | Claims benefit of provisional | 60/751,305 | 2005 Dec. 19 |
| 11/639,088 | Claims benefit of provisional | 60/848,804 | 2006 Sep. 29 |
| 11/639,088 | Claims benefit of provisional | 60/849,685 | 2006 Oct. 5 |
| PCT/US10/000237 | Continuation in part of | 11/639,088 | 2006 Dec. 14 |
| This application is | Continuation in part of | 16/430,061 | 2019 Jun. 3 |
| 16/430,061 | Continuation in part of | 15/878,488 | 2018 Jan. 24 |
| This application is | Continuation in part of | 16/430,061 | 2019 Jun. 3 |
| 16/430,061 | Continuation in part of | 15/872,108 | 2018 Jan. 16 |
| This application is | Continuation in part of | 16/430,061 | 2019 Jun. 3 |
| 16/430,061 | Continuation in part of | 15/203,882 | 2016 Jul. 7 |
| This application is | Continuation in part of | 16/430,061 | 2019 Jun. 3 |
| 16/430,061 | Continuation in part of | 15/143,168 | 2016 Apr. 29 |

FIELD OF INVENTION

The present inventions provide a new structure and passenger transport paradigm for accommodating passengers in a vehicle with particular attention paid to safety, utility and comfort and virtual navigation in real spaces.

SUMMARY

The Drawings illustrate embodiments of the inventions. These features and more are described below. The invention relates to the referenced filed applications.

BRIEF DESCRIPTION OF DRAWINGS 20-001—Table top
20-002—Back pivot-arm
20-003—Front-pivot-arm
20-004—First pivot member
20-005—Second pivot member
20-006—Third pivot member
20-007—Screen—privacy FIG. 1 represents the position of the tabletop used in the air sleeper in a position for use as a table. The privacy screen is at the front of the table also in a position to offer privacy to the occupant of the seat. Notably the second pivot member may allow sliding forward and backwards of the tabletop. This is in addition to the swiveling action of the front and back pivot arms which allow the position to be adjusted with appropriate locks in predetermined positions.

FIG. 2 show the tabletop in greater detail.

FIG. 2, as in FIG. 1 shows a tabletop in a usable position and the screen vertically deployed.

FIG. 3 shows the tabletop vertically inclined. From this position to thing off the front and back pivot arms and also sliding off the second pivot member will allow different positions for deployment of the table which now functions as a screen in addition to the privacy screen. This combination of the tabletop and the screen may also be pivoted about the third pivot member to be angled to the seat and in fact at the same angle as the aisle so that it may be deployed at the front edge of the seat when the passenger is sleeping or otherwise wants privacy relative to the aisle.

The tabletop may also be used as a projection screen as noted below and such a position would facilitate that function.

Figure 7:
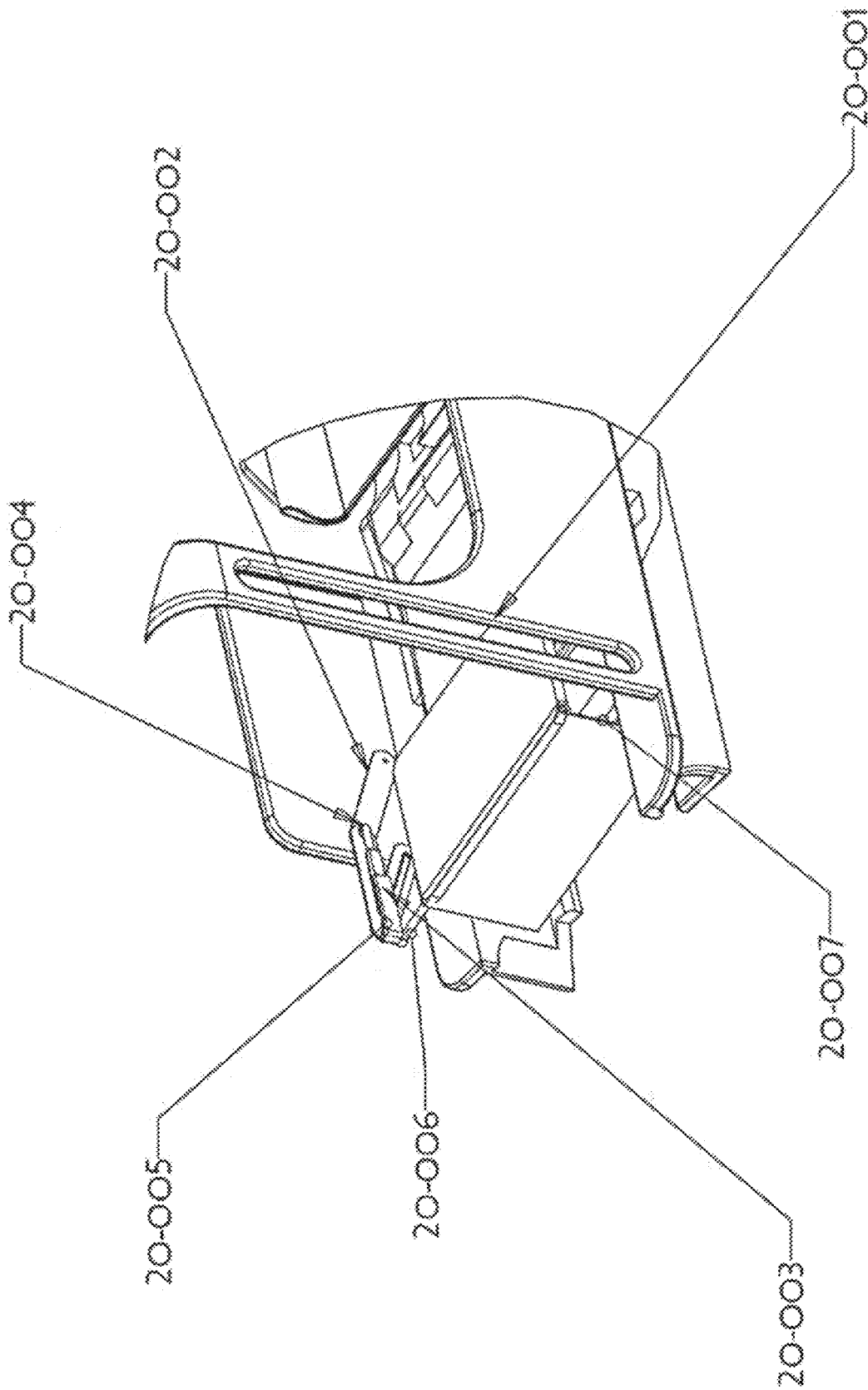

FIG. 7 illustrates a position for a horizontal tabletop at a lower level and forward from the passenger using the tilting mechanisms from the back and front pivot arms and sliding mechanisms of pivot members to allow service to the passenger at a lower political level by the service provider. Moreover, the handle as seen on the front pivot arm may be actuated by the passenger to allow this motion for service and back to a position convenient for use of the tabletop.

Figure 8:
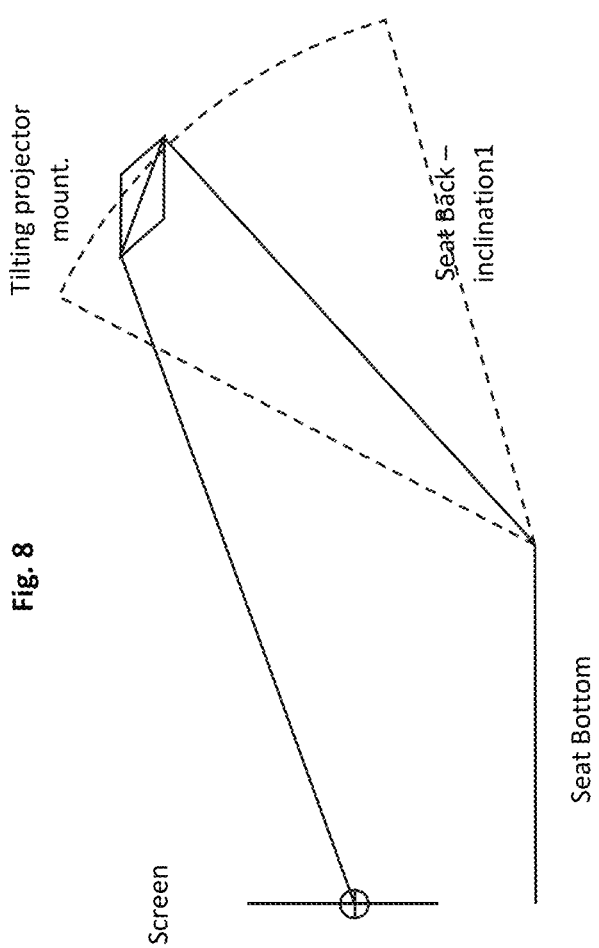

FIG. 8 shows a mechanism for a projector attached to the seatback of the air sleeper's seat to project to a screen at the front of the seat space. The screen may be very oriented tabletop, or a screen that is deployed from the top frame of the air sleeper. Considering that the seatback may have different angular orientations to the vertical provision needs to be made for the projector to project to the screen. While there are many complex control mechanisms available, a simple approach minimizing both weight and my function, is to use the direction of gravity by supporting the projector appropriately so that there is a horizontal line for calibration available, and also using the angle of the seatback. Using these two references the projection direction of the projector may be maintained to be at the center of the screen by using a predetermined fraction of the angular motion of the seatback along with a correction fixed angle.

Figure 9:
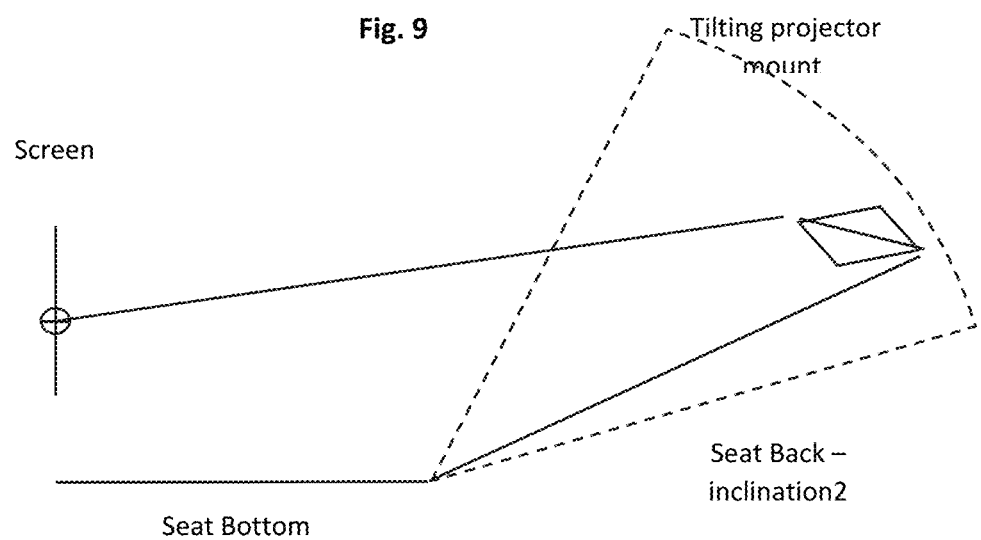

FIG. 9 illustrates a different inclination of the seatback with the same mechanism in place.

Figure 10:

FIG. 10-13 show an embodiment of the drawer storage below the seat in the air sleeper structure. In FIG. 10 the passenger has opened the drawer. The drawer may be opened with a "kick switch" which allows the utility of opening the drawer without bending down. Moreover, there is no lifting heavy baggage above head level as in conventional aircraft.

Figure 11:

In FIG. 11 the luggage is loaded into the drawer.

Figure 12:
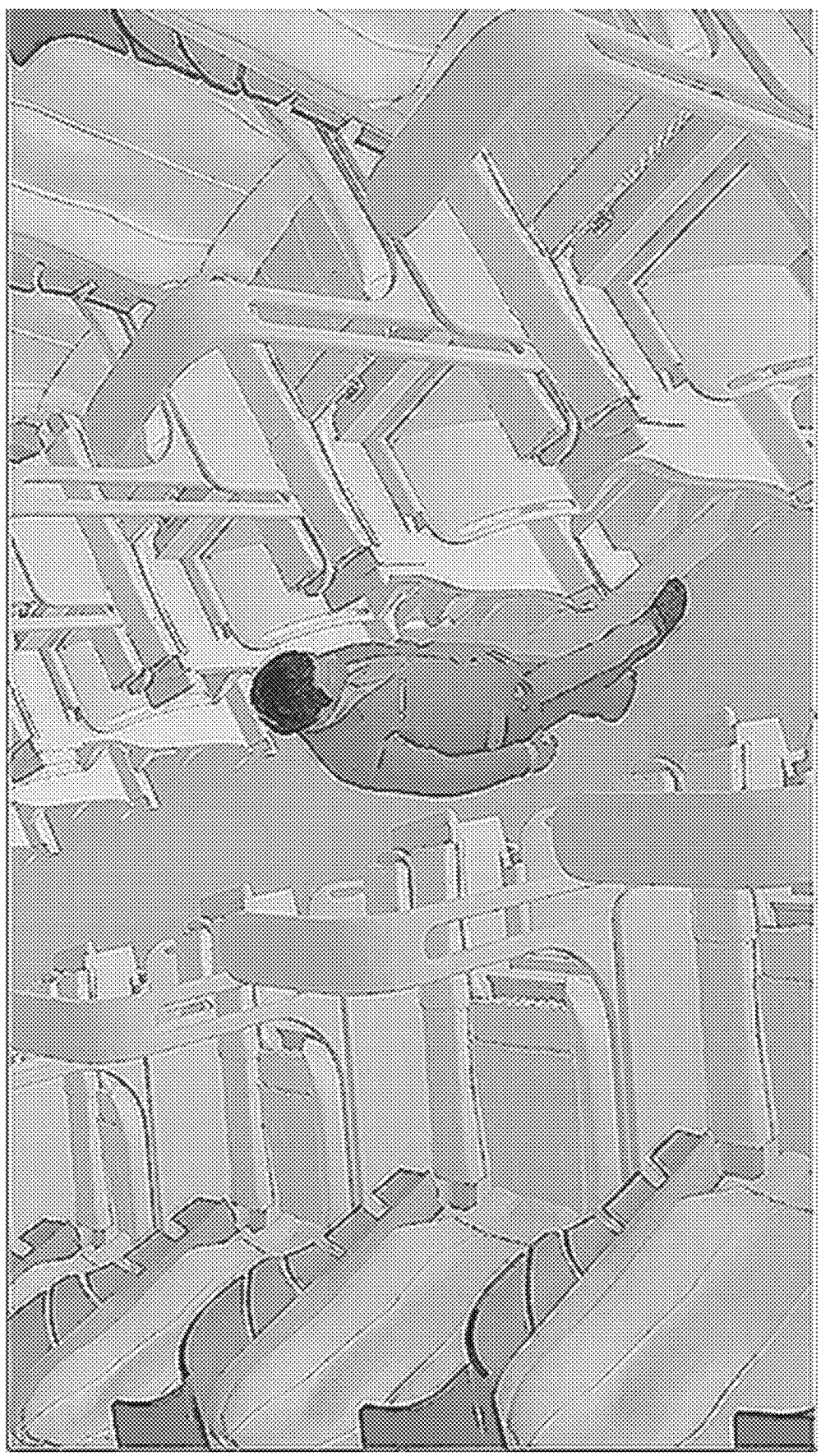
Figure 13:

FIGS. 12 and 13 shows the kick operation to shut the drawer. Again this process eliminates the need to bend down to attend to storing hand luggage.

Figure 14:
Figure 15:
Figure 16:

FIGS. 14, 15 and 16 show a side screen that is deployed at the time the seat becomes a flatbed for privacy vis-à-vis the sides. This may be independently controlled also to provide privacy.

Figure 17:
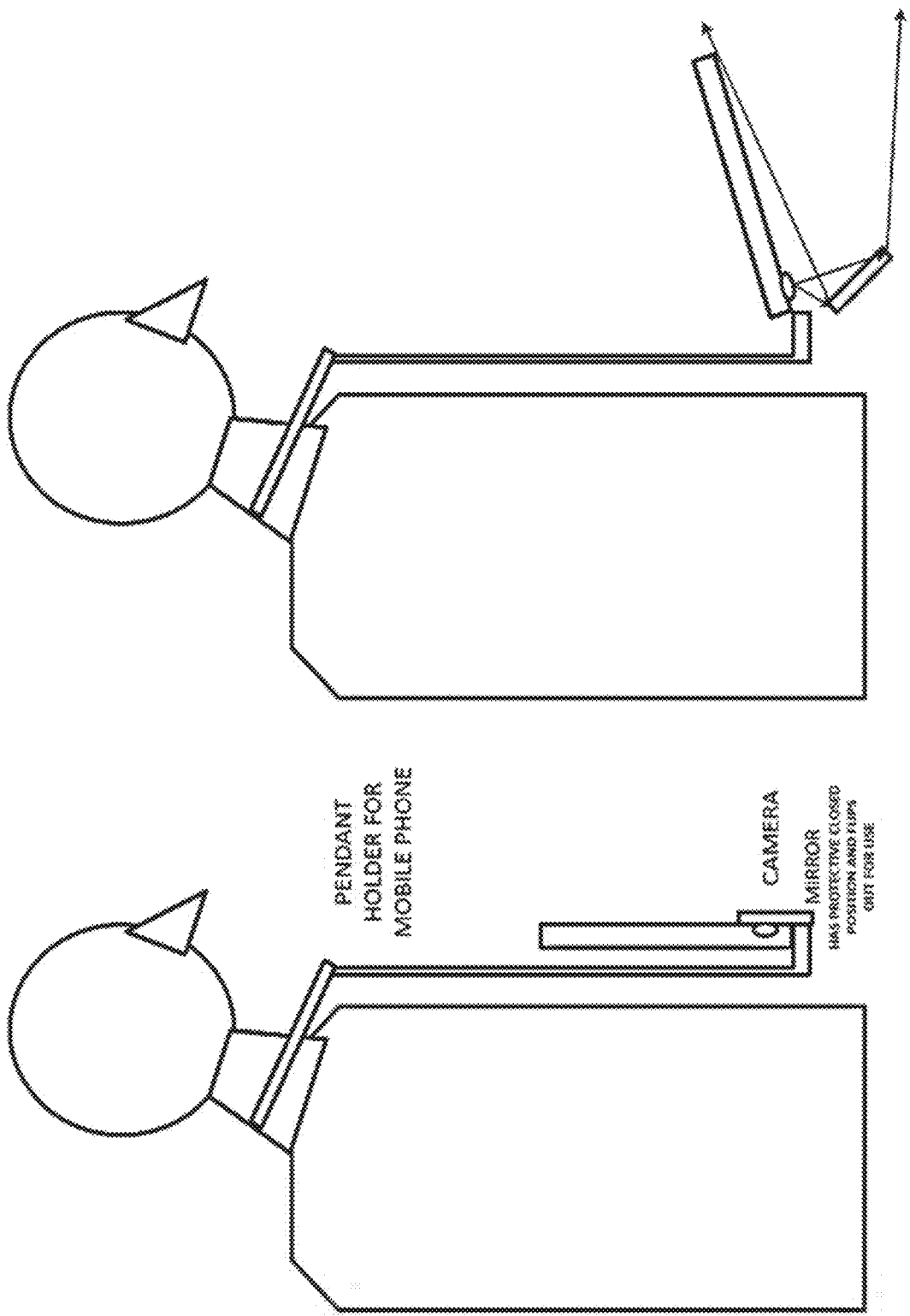

FIG. 17 shows an embodiment of the support for Source on the Source Member for the virtual Navigation system.

Figure 18:
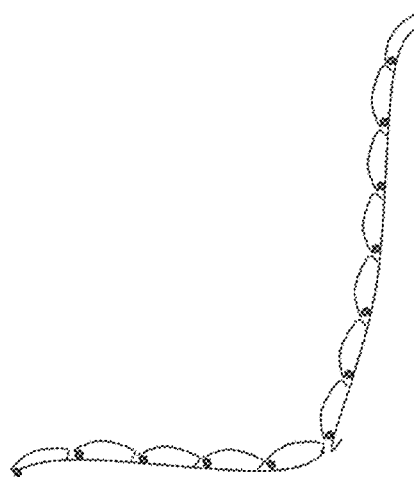
Figure 19:
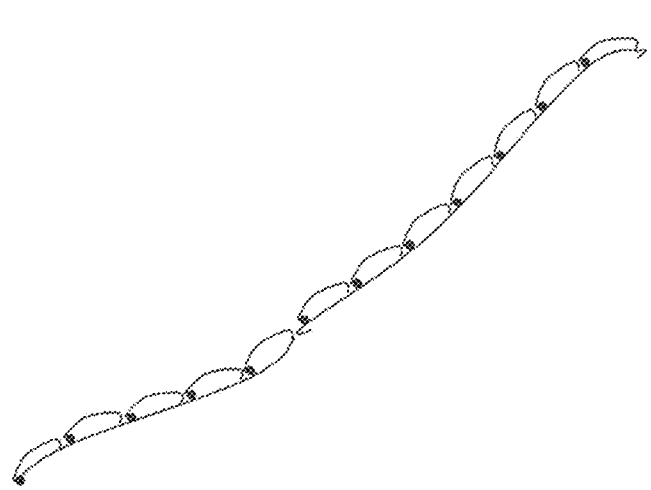
Figure 20:
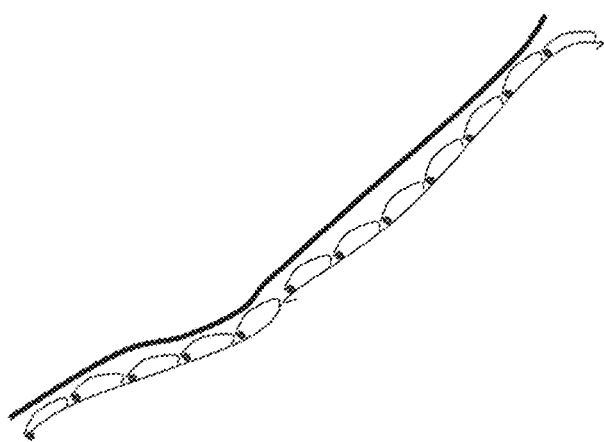
Figure 21:
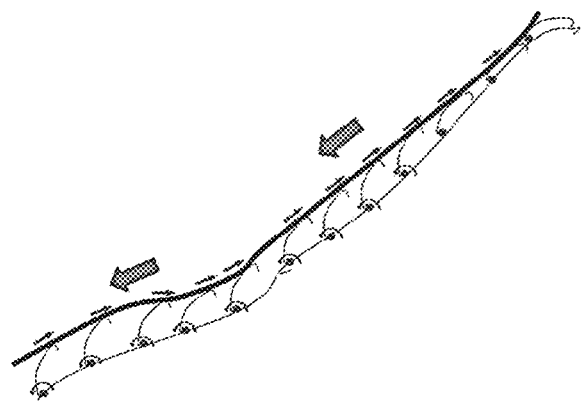

FIG. 18, 19, 20, 21 show the operation of the adaptive support seat for the high angle flat bed recline seat usually for economy class in aircraft.

21-001—stairs
21-002—Latches
21-003—Seat pan support
21-004—Beam—structural and part of airsleeper enclosure
21-005—Lip for seat pan lateral support. Latched to adjoining AirSleeper structure may be installed.
21-006—Latch wells & latch attachments. For mounting on seat tracks or frames attached to seat tracks.
Latches on seat tracks and/or between lower and upper AirSleeper units may have vertical excursions and allowances in such situations are provided.
21-007—Beam structure for support of upper AirSleeper units.
Serves as wall for lower AirSleeper enclosures.
21-008—Seatback
21-009—Seat bottom
21-010—Leg rest
21-011—Seat pan
21-012—Arm rest and side sleep surface
21-013—Support surface for seat assembly
21-014—Handrail/bannisters for climbing steps
21-015—Support for privacy curtain/oxygen/projector/video screen
21-016—Base of upper AirSleeper enclosure with in some embodiments houses latches for attachment to
lower AirSleeper units and/or the laterally displaced AirSleeper units.
21-017—Lower AirSleeper unit.
21-018—Upper AirSleeper unit
21-019—Unlatched and raised upper air sleeper unit
21-020—Lower AirSleeper unit raised for removal. (or re-insertion)
21-021—Latches for adjoining AirSleeper units. Single or multiple vertically and/or horizontally spaced.

Figure 22:
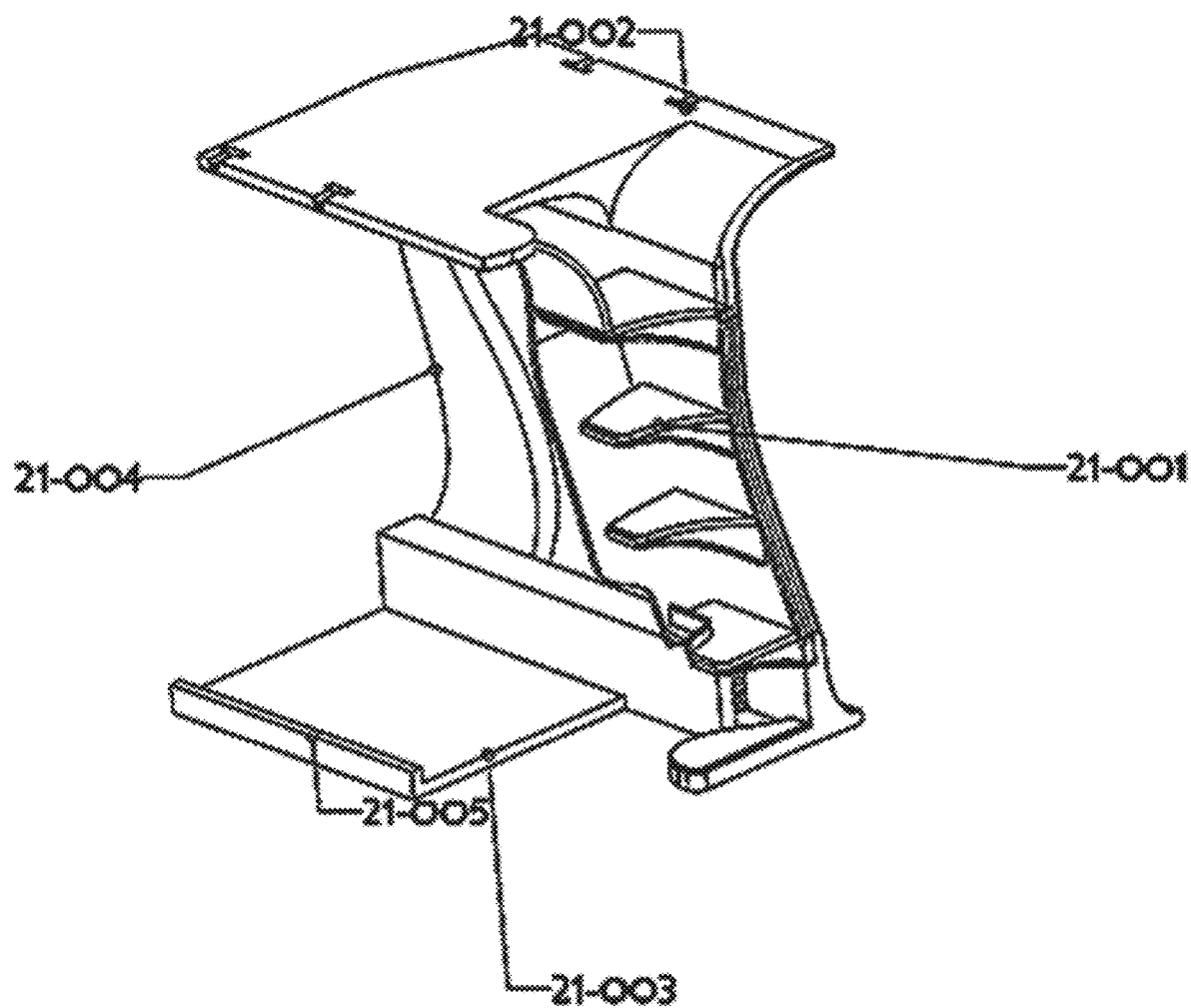

FIG. 22 is a view of an embodiment of the AirSleeper lower level enclosure, built as a beam representing the wall between two AirSleeper enclosures.

Figure 23:
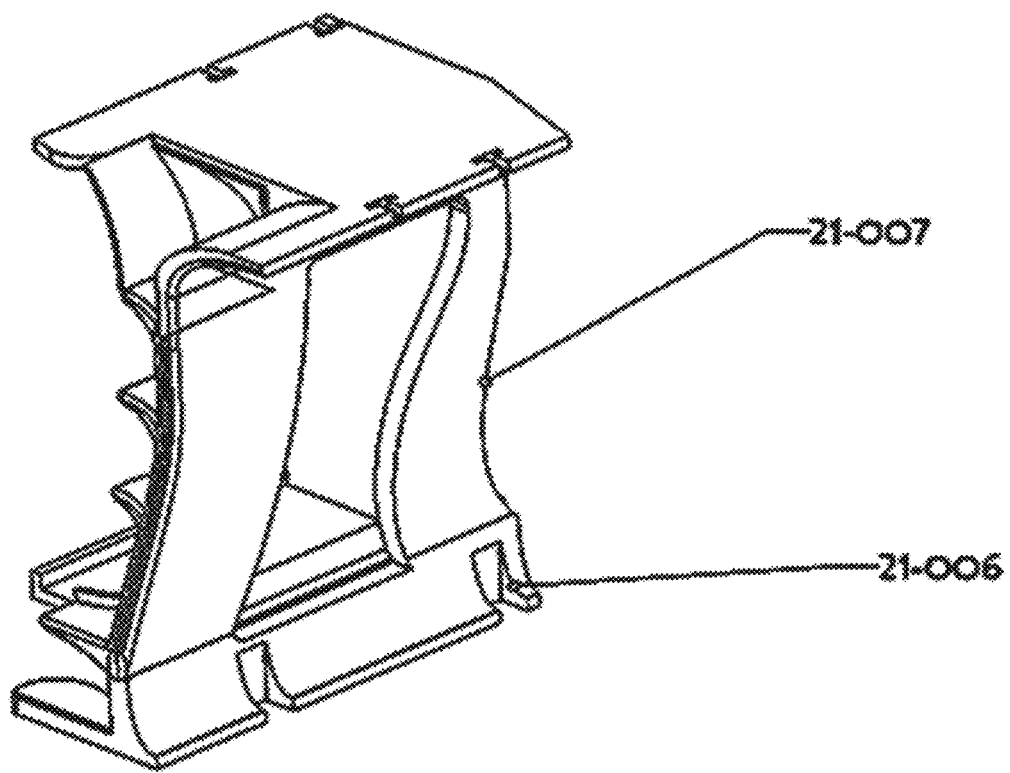

FIG. 23 is a second view of the same enclosure with a beam structure.

Figure 24:
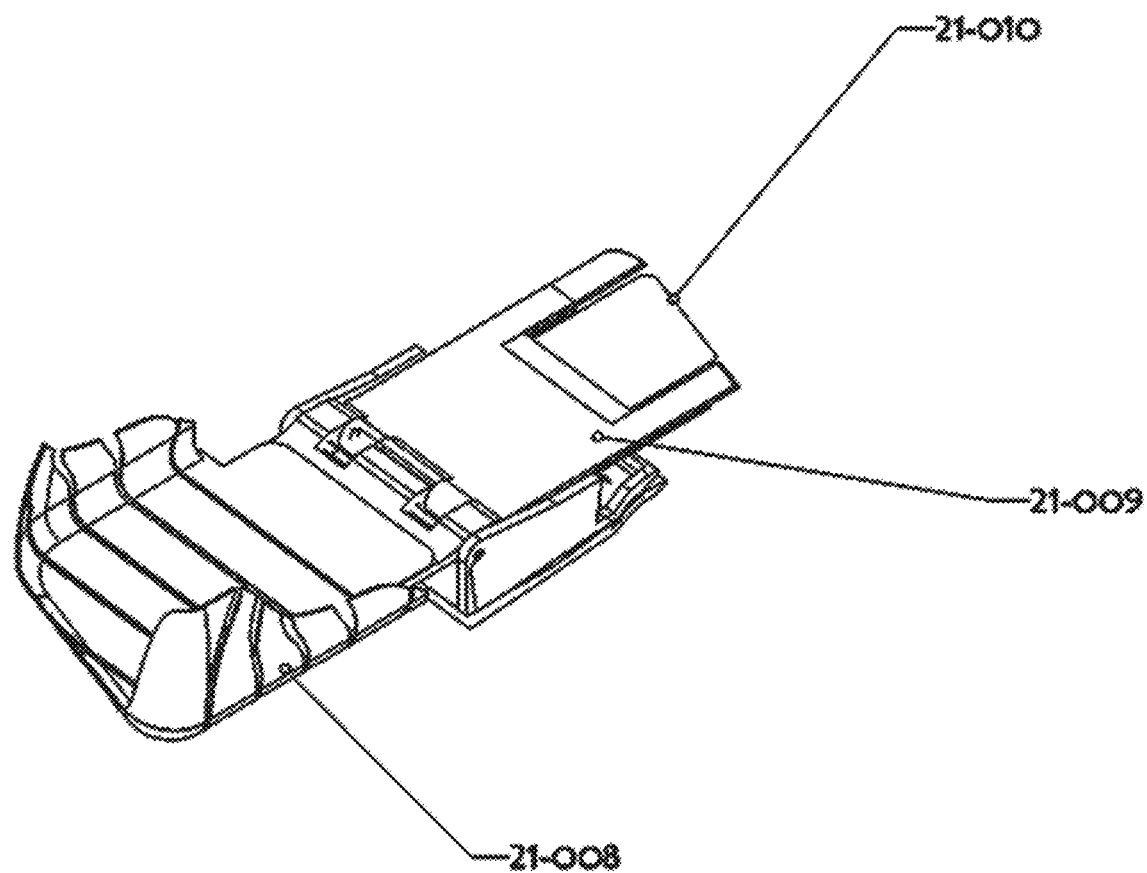

FIG. 24 is the (potentially universal in some embodiments) seat assembly that can be installed in the top or bottom air sleepers.

Figure 25:
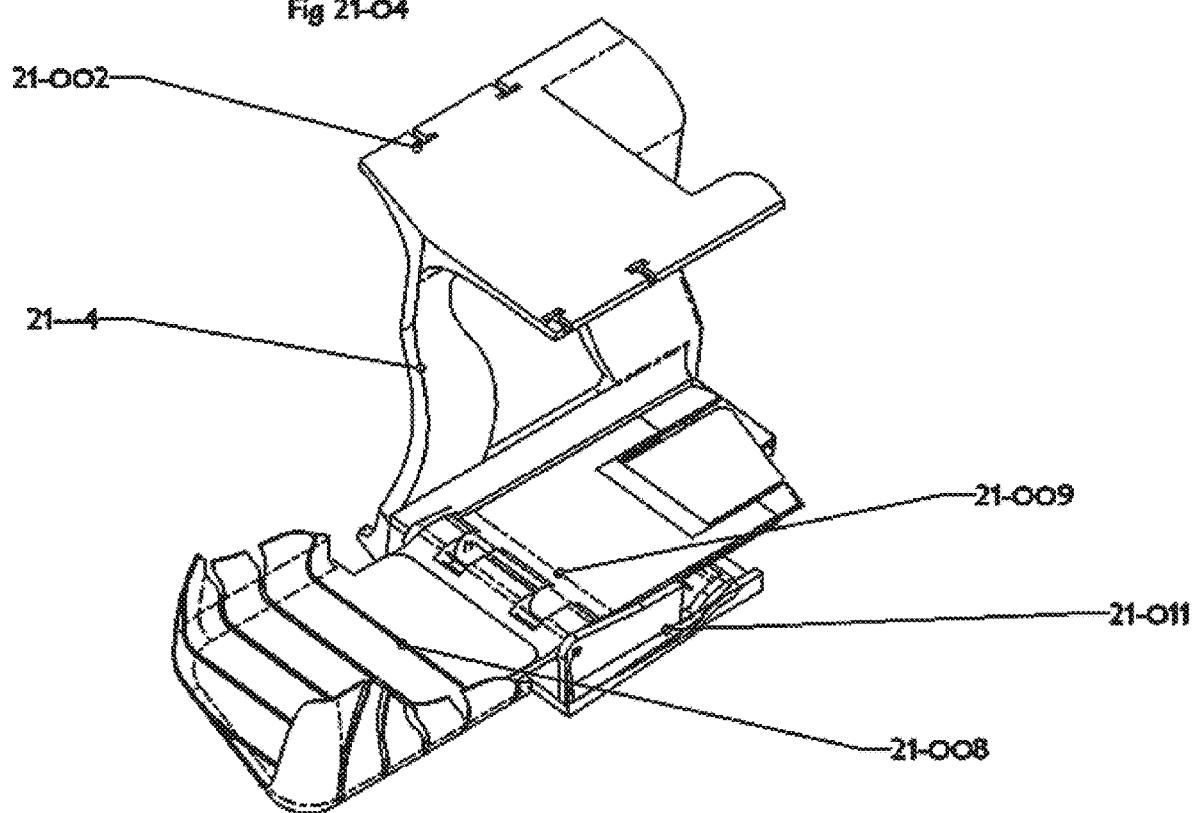

FIG. 25 is the lower enclosure/support beam with the seat assembly installed.

Figure 26:
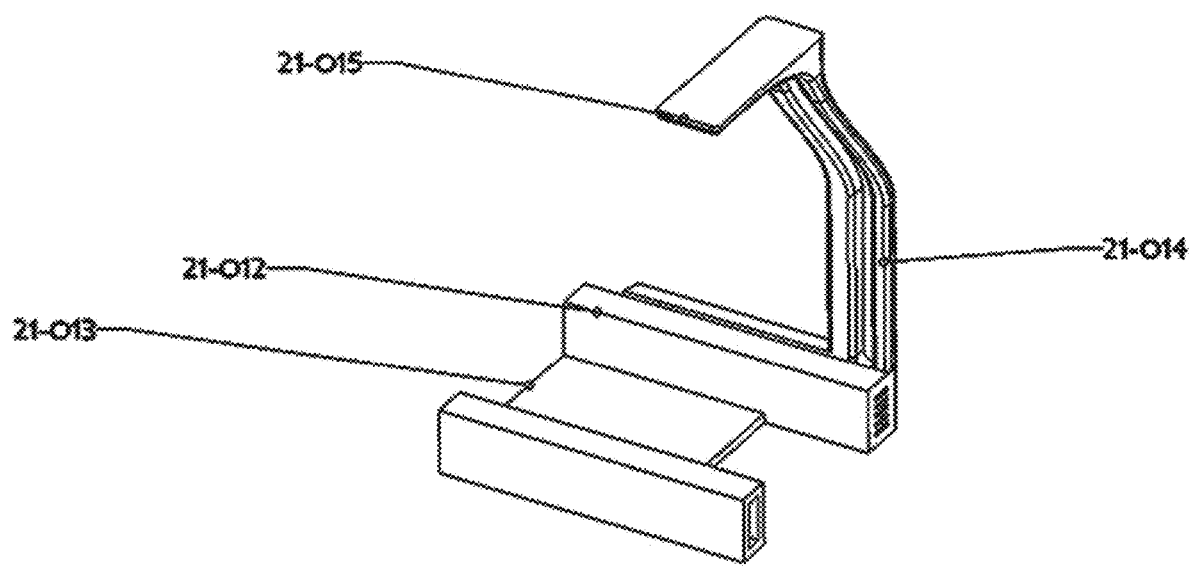

FIG. 26 is the Upper enclosure support. It may have a hand rail and support for oxygen and projector or screen.

Figure 27:
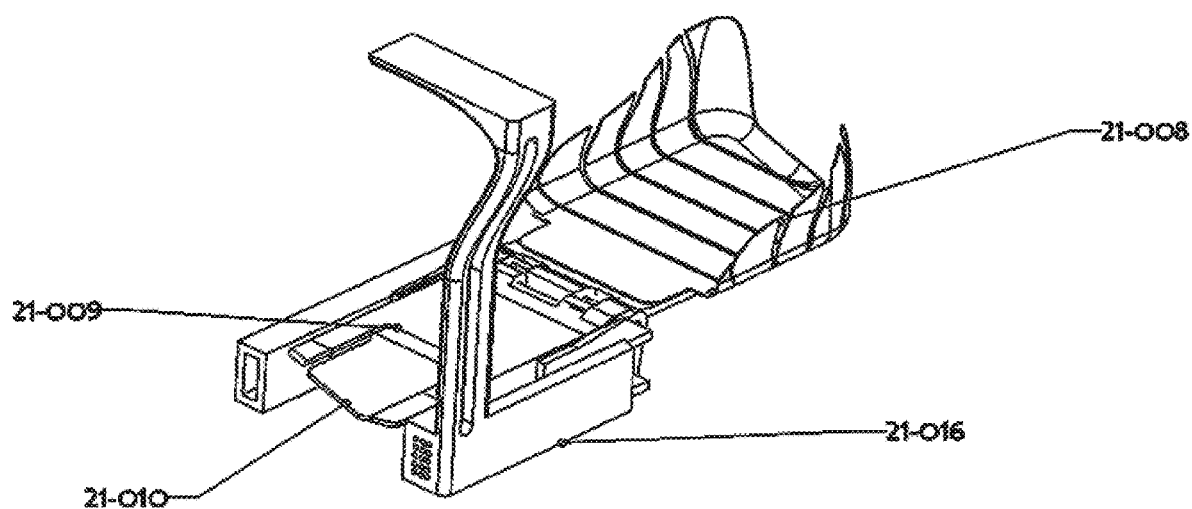

FIG. 27 is the Upper AirSleeper enclosure with seat assembly installed.

Figure 28:
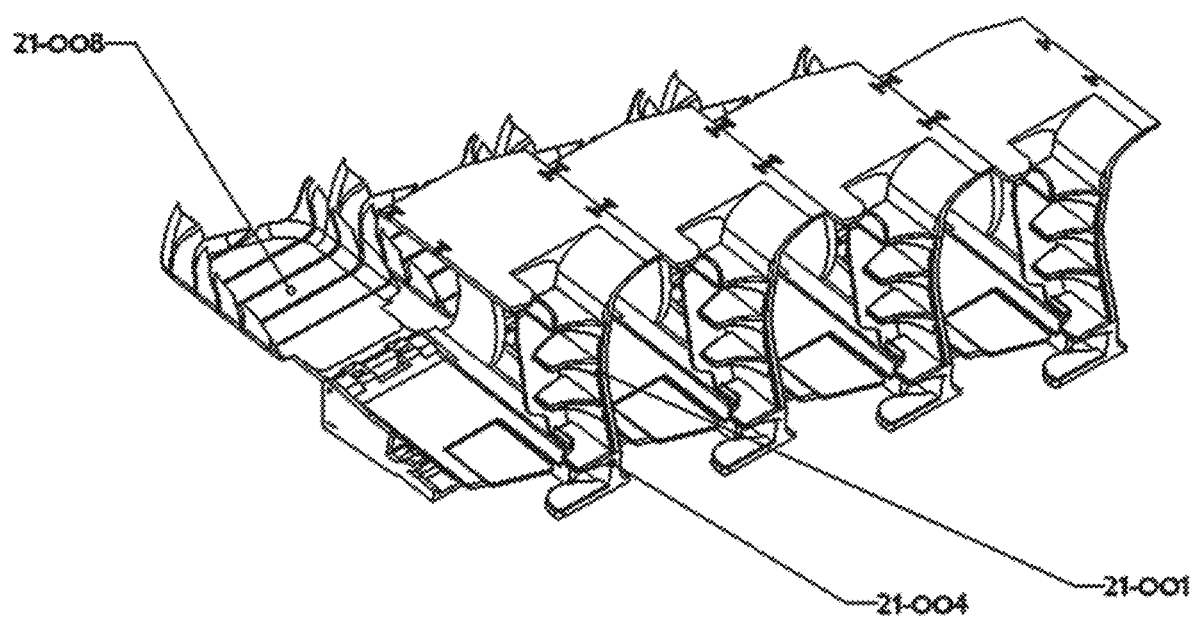

FIG. 28 is an assemble array of lower airsleeper enclosures. Notably the lateral latches between the units line up. This embodiment has a "herring bone" angle to the lateral.

Figure 29:
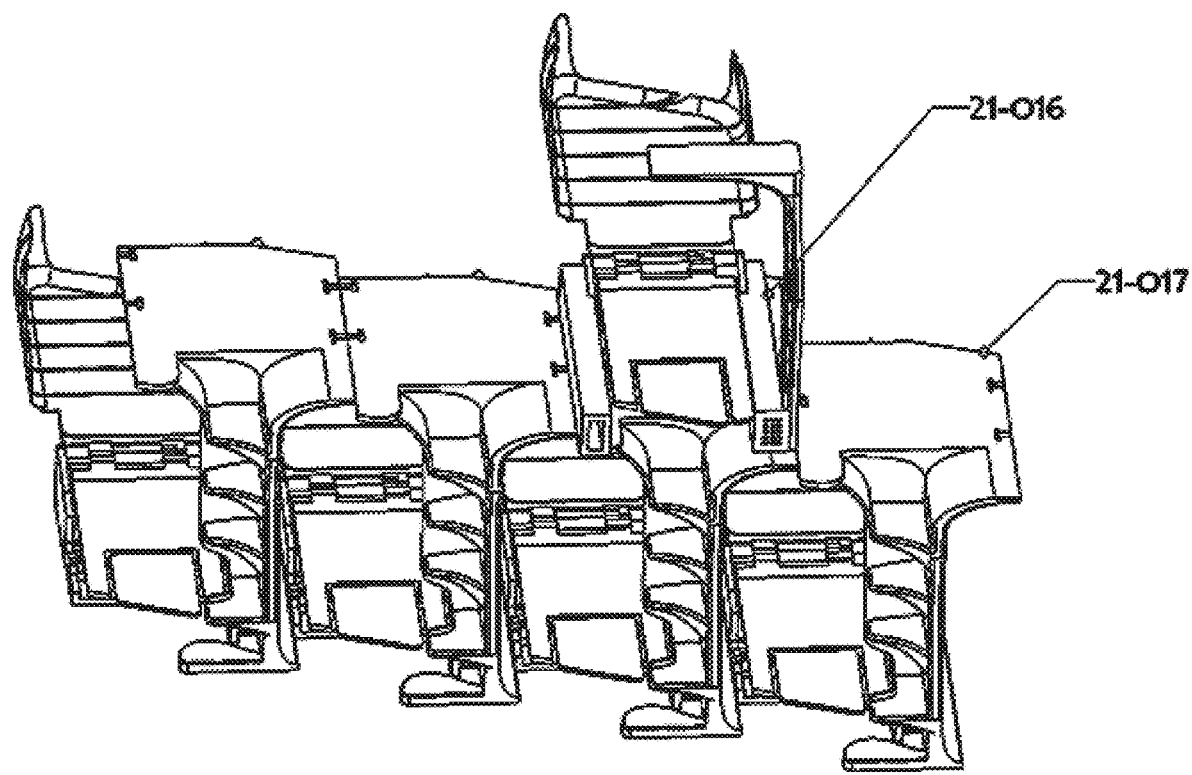

FIG. 29 is a lower array of AirSleeper units with a single upper AirSleeper unit installed.

It may be noticed that in this embodiment the Upper AirSleeper is entirely on the horizontal flange provided by the beam below along with the steps. The flange of the lower airsleeper enclosure on either side of the vertical beam latch to the adjoining lower airsleeper beam flanges to form the enclosures. They also latch on the upper air sleeper units.

Notably other embodiments may have an overlap ie the flanges are asymetric and therefore the upper airsleeper units rest on flanges of adjoining lower airsleeper beams. The advantage is rigidity which has structural benefit and weight saving, but the disadvantage in that to remove a single lower airsleeper unit it may be necessary to remove two upper units if there is such an overlap. Often latches between the adjoining lower AirSleeper flanges can be designed to support the required loading without the overlap of the upper units over two lower units. The lower latches of the lower tier Air Sleepers may be attached directly to the latches on the seat tracks at the floor of the aircraft or to the frames that include storage bins below the Lower AirSleeper units. These alternative embodiments will depend on the available vertical space in the cabin. The embodiments that have the lower tier of Air Sleeper enclosures attached directly to the latches on the seat tracks are typically attractive when there is a smaller vertical clearance but in such situations storage bins may be located above the upper tier of AirSleeper units.

Figure 30:
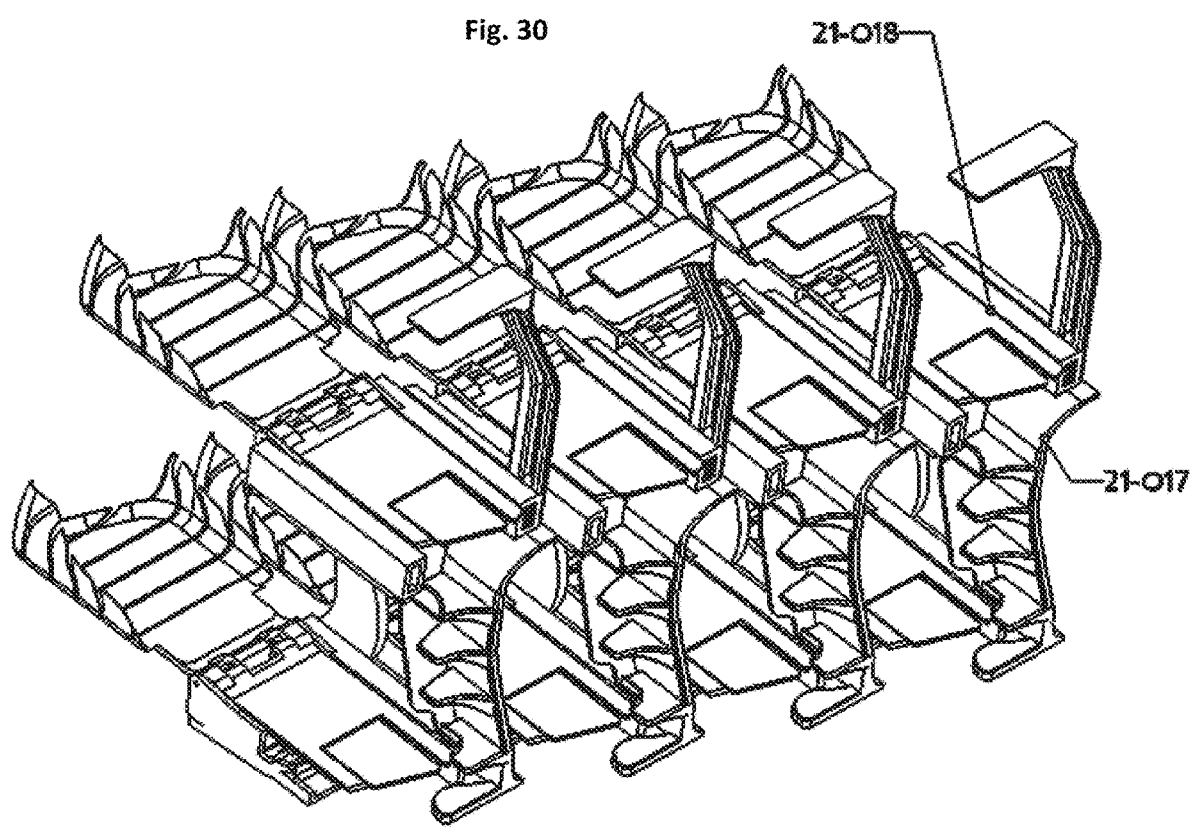

FIG. 30 shows the upper and lower arrays attached together.

Figure 31:
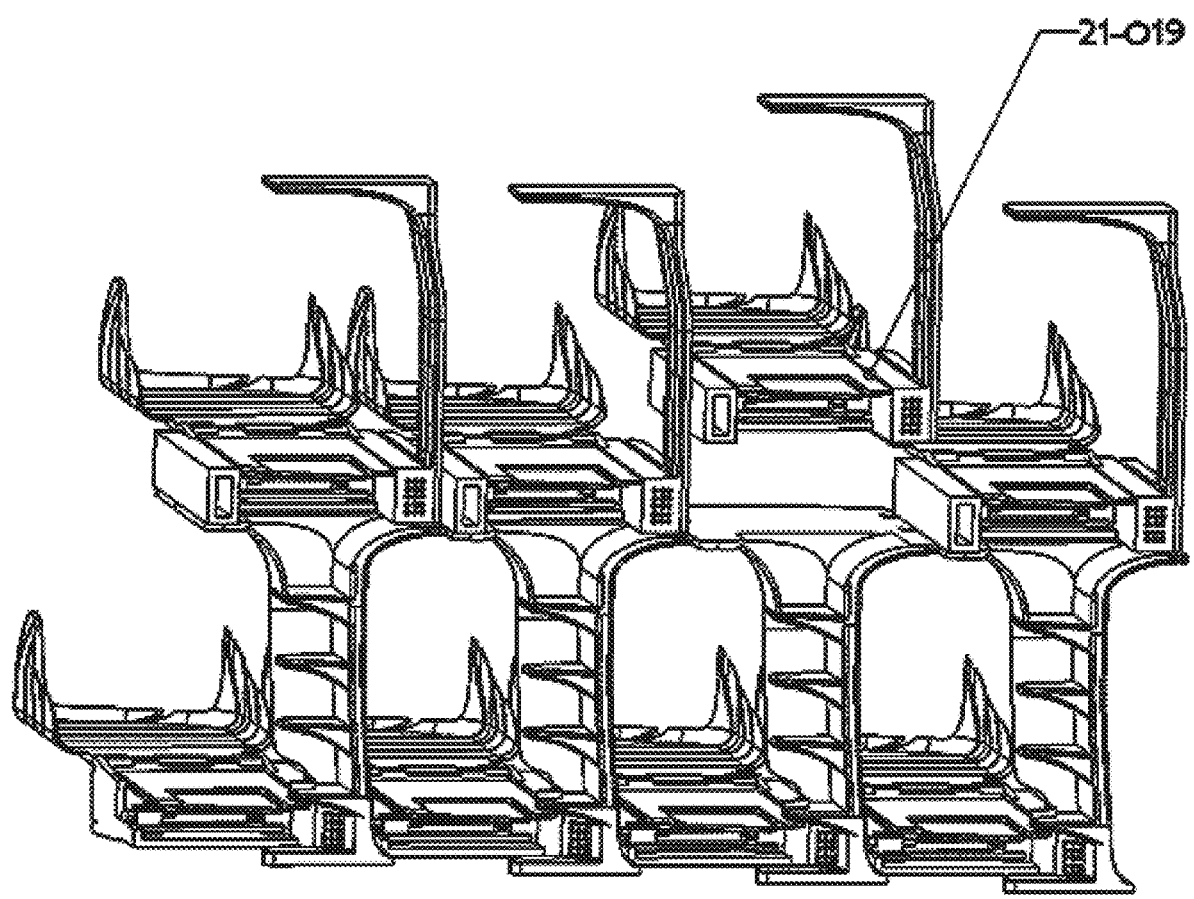

FIG. 31 shows the removal of a single upper tier AirSleeper without disrupting the rest of the array. Notably the back rest can be folded up and in to make a compact unit. Moreover, when the back rests of all the AirSleepers are raised there is a corridor in that space along the fuselage of the aircraft.

A second option is of course to unlatch the seat assembly separately and then the upper AirSleeper unit.

Figure 32:
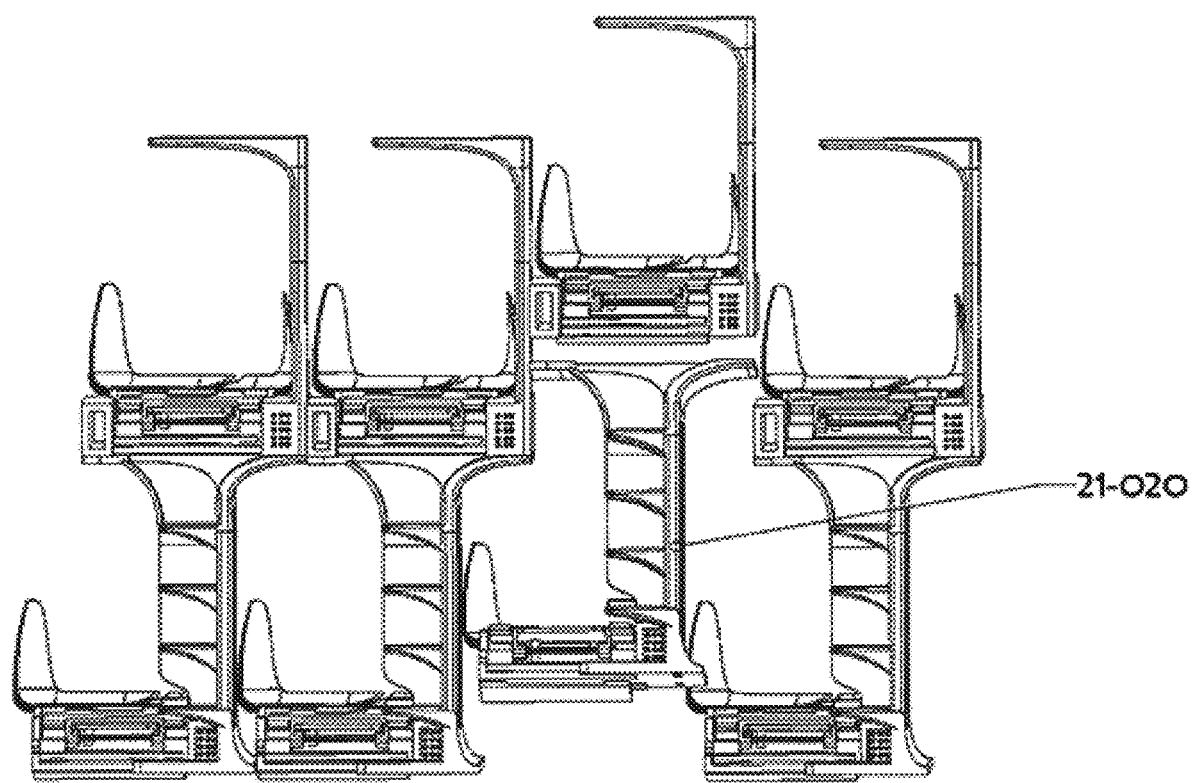

FIG. 32 shows an unlatched lower AirSleeper unit that can be raised or tilted back for removal there is no impeding structure. Notably when moved back when the seat back is raised it can be removed in a temporary corridor created by the raised seat backs all the way to the door way.

Figure 33:
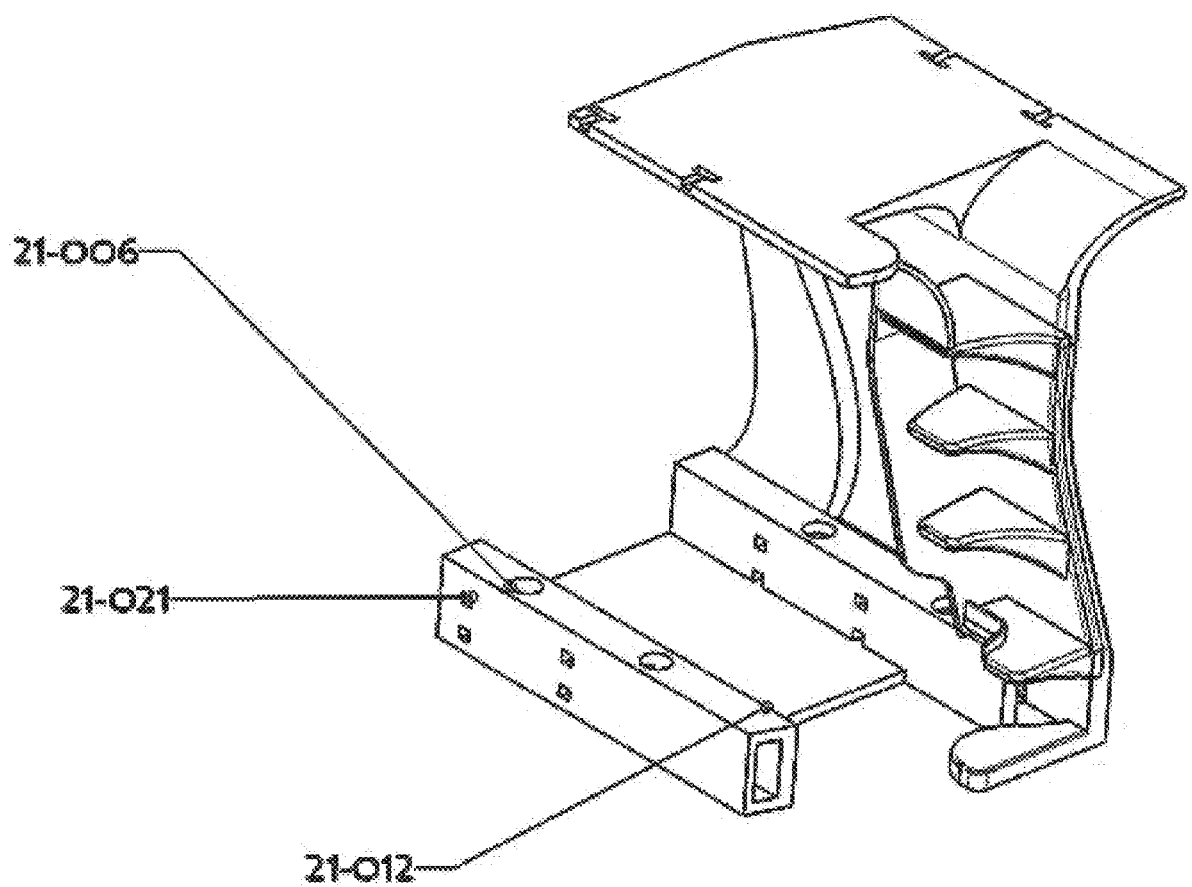

FIG. 33 shows a different embodiment of the lower AirSleeper unit. It has a lower bracing element that can transfer moments and tensile and compressive loadings to the adjoining unit. The bracing sections are housed in the armrest which also functions as part of sleep surface.

Figure 34:
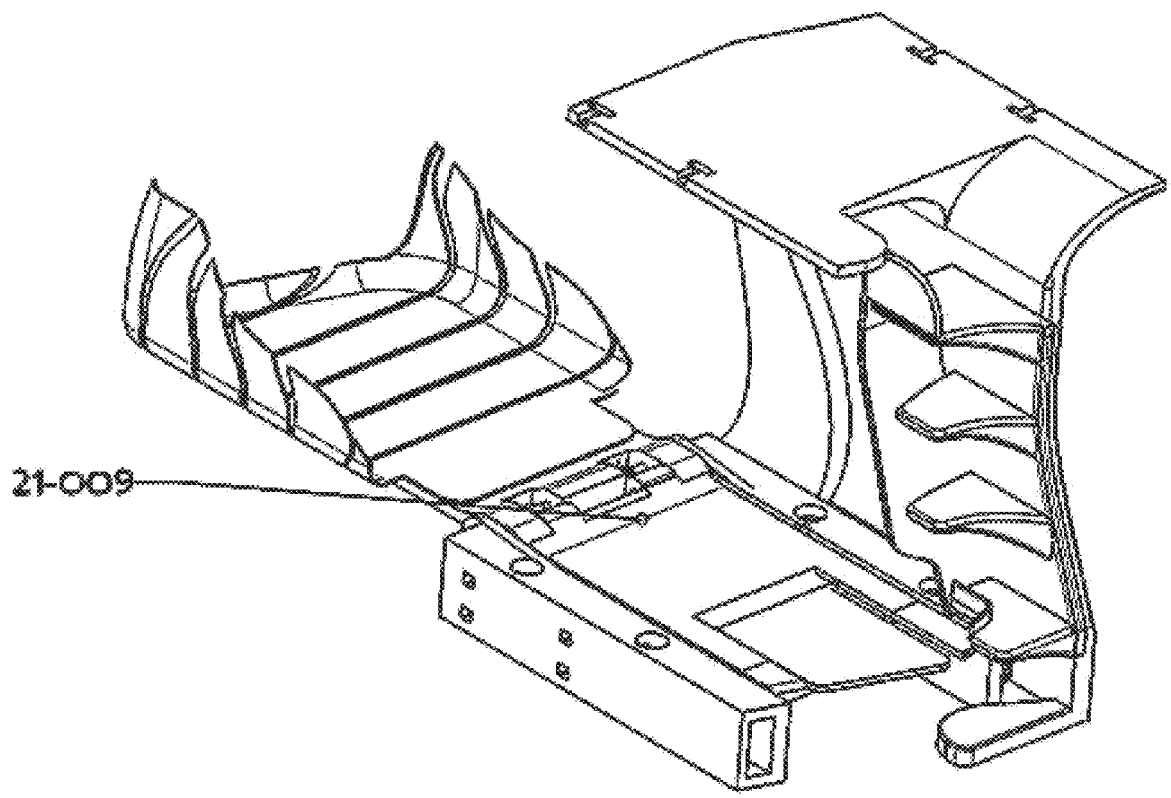

FIG. 34 shows the embodiment of FIG. 33 with the seat assembly installed.

Figure 35:
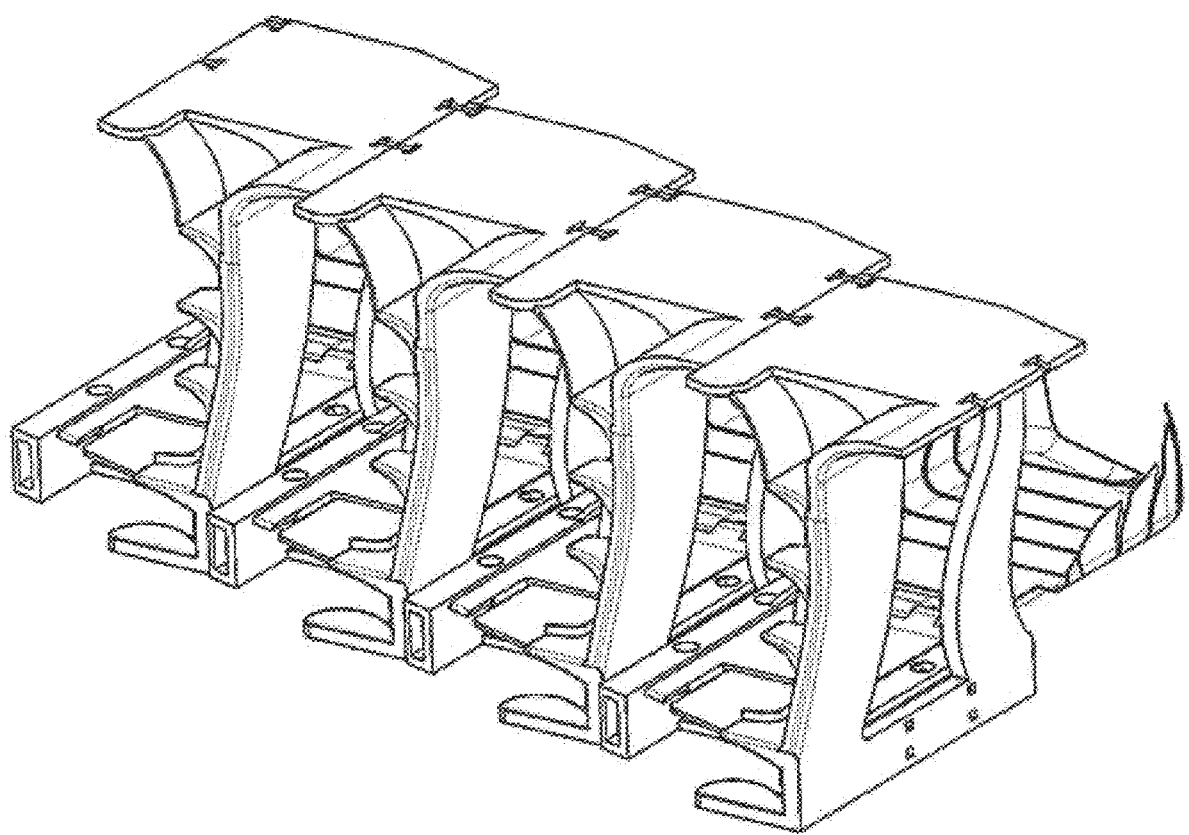

FIG. 35 shows an array of lower AirSleeper units attached together. The lateral latches between the lower units if in an embodiment may have spacers and the arm rest/side brace units displaced from the surface of the adjoining Air Sleeper unit so that removal and replacement is facilitated. Such spacers may be designed to be retractable into the body of the side brace when the latch is enabled. Ie, the latch can be deployed through the aperture shown along with spacers that offer compressive load support while the latch provides tensile and/or lateral load support about the aperture on the adjoining unit. Such an arrangement would result in a gap between adjoining AirSleeper units that will facilitate removal and replacement of individual units without affecting the adjoining structures.

Figure 36:
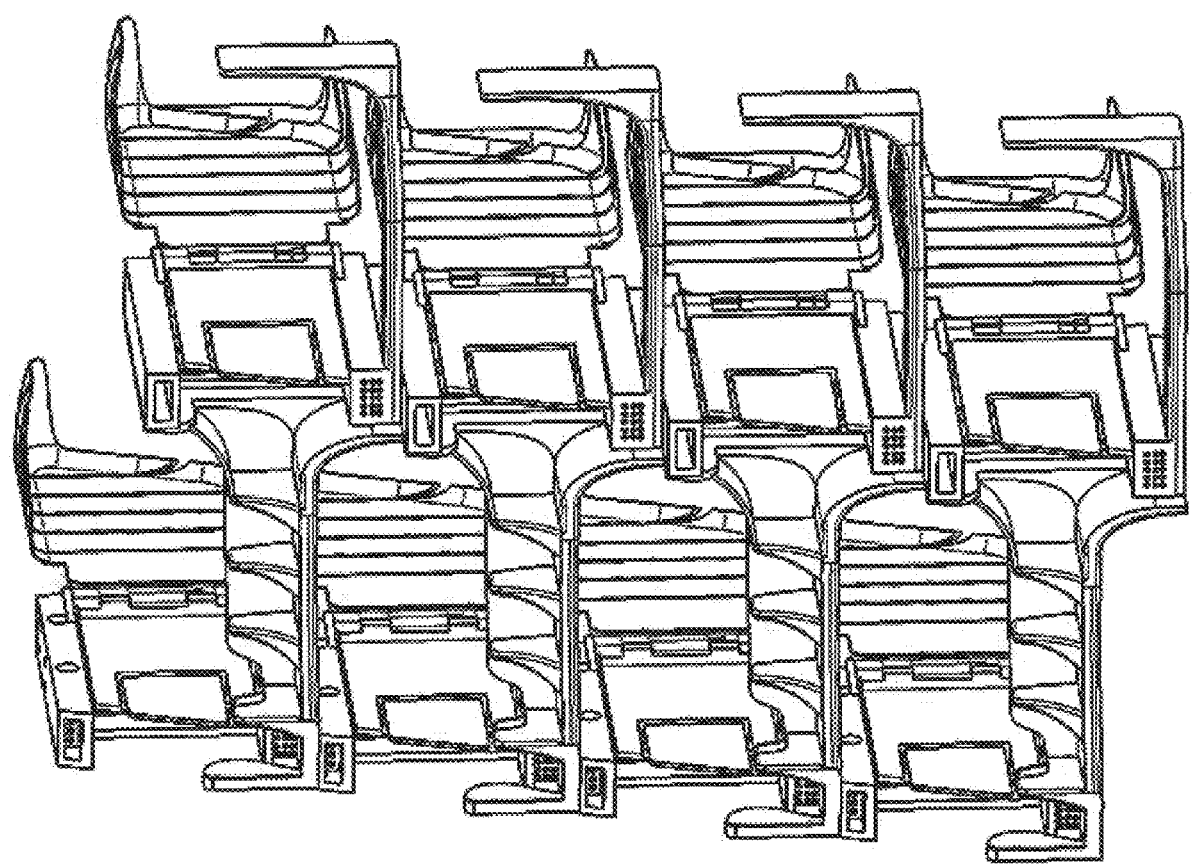

FIG. 36 illustrates the array of FIG. 35, where one of the upper AirSleeper units have been detached for removal.

Figure 37:
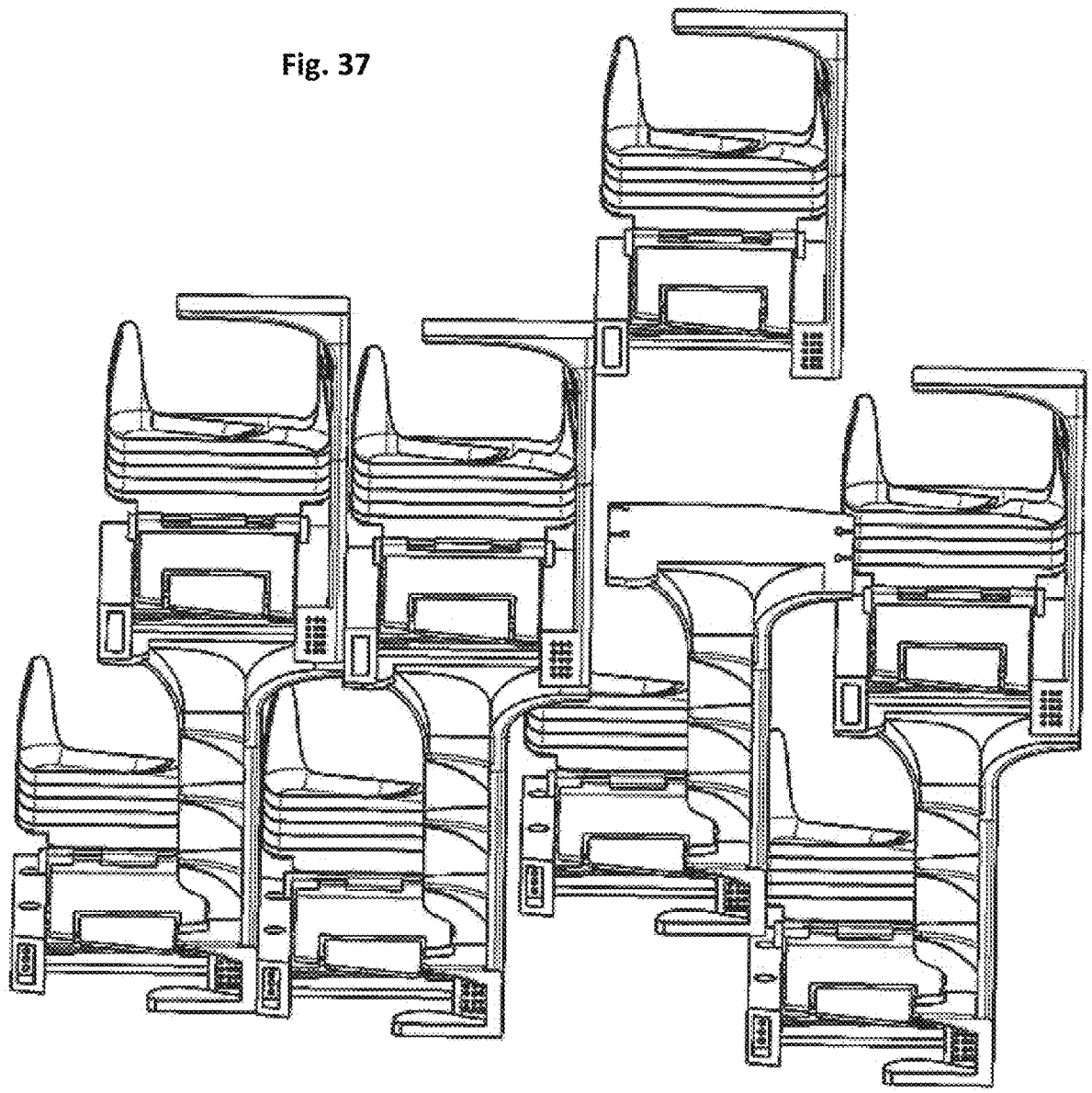

FIG. 37 illustrates the array of FIG. 35, where the lower unit has been detached for removal. As can be seen, there is lateral movement possible for ease of removal of the lower AirSleeper unit.

Notably the illustrations are for the embodiments where the lower airsleeper units are mounted directly to the seat tracks. This may be at a low level just above the seat tracks as shown or with extending sections of the beam section 21-007 below the level of the seat pan support 21-003. They may be indirectly mounted to the seat tracks as well. For example, a foot/frame structure may be used below the lower AirSleeper units as in prior disclosures and the Lower AirSleeper units secured to the top of such foot frame assemblies. In such elevated architecture for the Lower AirSleeper units the Latch wells may not need to be deep and may not be needed at all of the excursion of the latch support points of the foot/frames relative to the seat tracks are moderate.

FIGS. 38-43, show another embodiment of the airsleeper. In these and in the exploded view of FIG. 44, the vertebrae that attach the back fins to the spine may be slidably attached to the spine so that the vertebrae can slide along the spine in a controlled manner.

Figure 44:
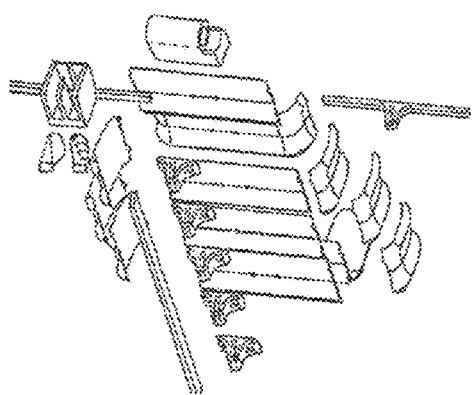

FIG. 44 also shows a version of the spool with differential diameters for retracting the vertibrae.

Figure 45:
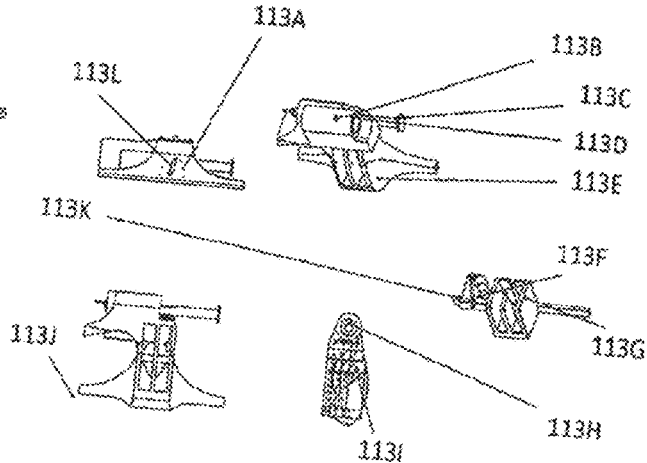

FIG. 45 Shows the structure of the Spool for seatback height adjustment and the pivot mechanism in one possible embodiment. 113A—Holes allow cable attachments to each of the ribs from the spool. Different radii of the spool for differential movement of the ribs is catered for; 1138—Splined cylinder; 113C—Axle with keyway for pin; 1130—Pin that rides in a keyway in axle; 113E—General housing that encapsulates the spool housing and the back pivot assembly. May have a structural function; 113F—Two symmetrical spools that rotate through 90 degrees to pull in or let out the cable controlling the rib positions; 113G—housing for the spools also have in this embodiment the support for the arm rests; 113H—Mechanism for back-pivot angular adjustment; 113 I—The spool housing showing the position of the spools with different radii for each of the ribs; 113 J—Extension to housing to attach a lever that can pivot at this point and be attached at its end to the pin, thereby allowing actuation of the pin by depression of the lever; 113 K—Axis of the spools may be actuate by a long arm and a lever on the side of the occupant; 113 L—cut out for the spine.

Figure 46:
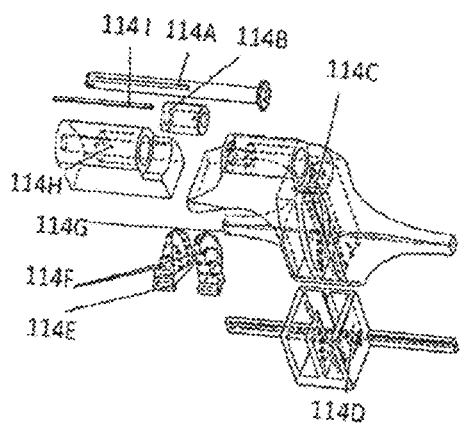

FIG. 46—is a Spool exploded view 114A—Axle with Key-way for pin. 114B—Splined cylinder (or keyed) to engage axle with geared end that engages the end of the cavity on housing attached to seat back. 114C—General housing that may substitute for or encapsulate the spool housing and may encapsulate the back pivot assembly (for the seat back motion) It may also have a structural function. 114D—Housing for spools also have in this embodiment the support for arm rests. 114E—Axis for the spools may be actuated by a long arm and lever on the side of the occupant. 114F—Two symmetrical "spools" that rotate by about 90 degrees to pull in or let out the cable controlling the rib positions. 114G—Extension to housing can be used to pivot a lever that is pivotally attached to the Key, thereby leaving the key to move in and out, and thereby resulting in the engagement and dis-engagement of the gears between the cylinder and the cavity of the housing attached to the seat back. The occupant can thereby control the angular orientation of the seat back by depressing the lever and rotating the seat back up or down. There will in many embodiments be a spring loading against the weight of the seat back. 114 H— Cavity for cylinder with spring loading to push geared end of cylinder towards the part attached to the seat bottom. The cavity at its other end has a smaller diameter that accepts the axle and has a corresponding keyway as on the axle. The Key with a head that can pull the cylinder rides in the key-way; 114 I—Pin that rides in the Key way on the axle.

DETAILED DESCRIPTION OF INVENTION

AirSleeper Components
Table Top for AirSleeper

The tabletop mechanism in an air sleeper we have many embodiments. The embodiment shown has multiple functions. First is a tabletop, second as a privacy screen and third as a projection screen for a projector mounted either above the occupant or on the seatback of the occupant seat.

Figure 1:
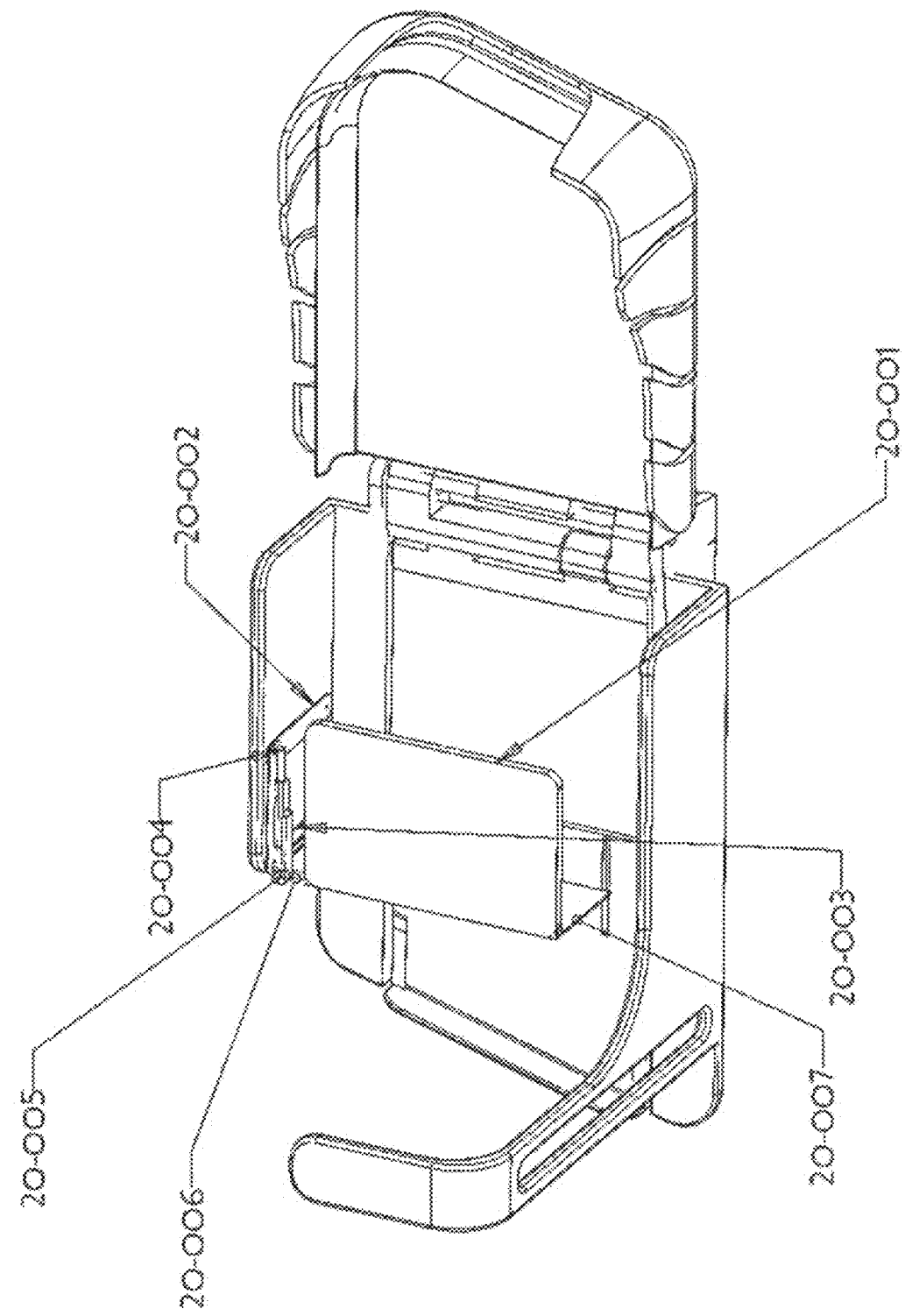
Figure 2:
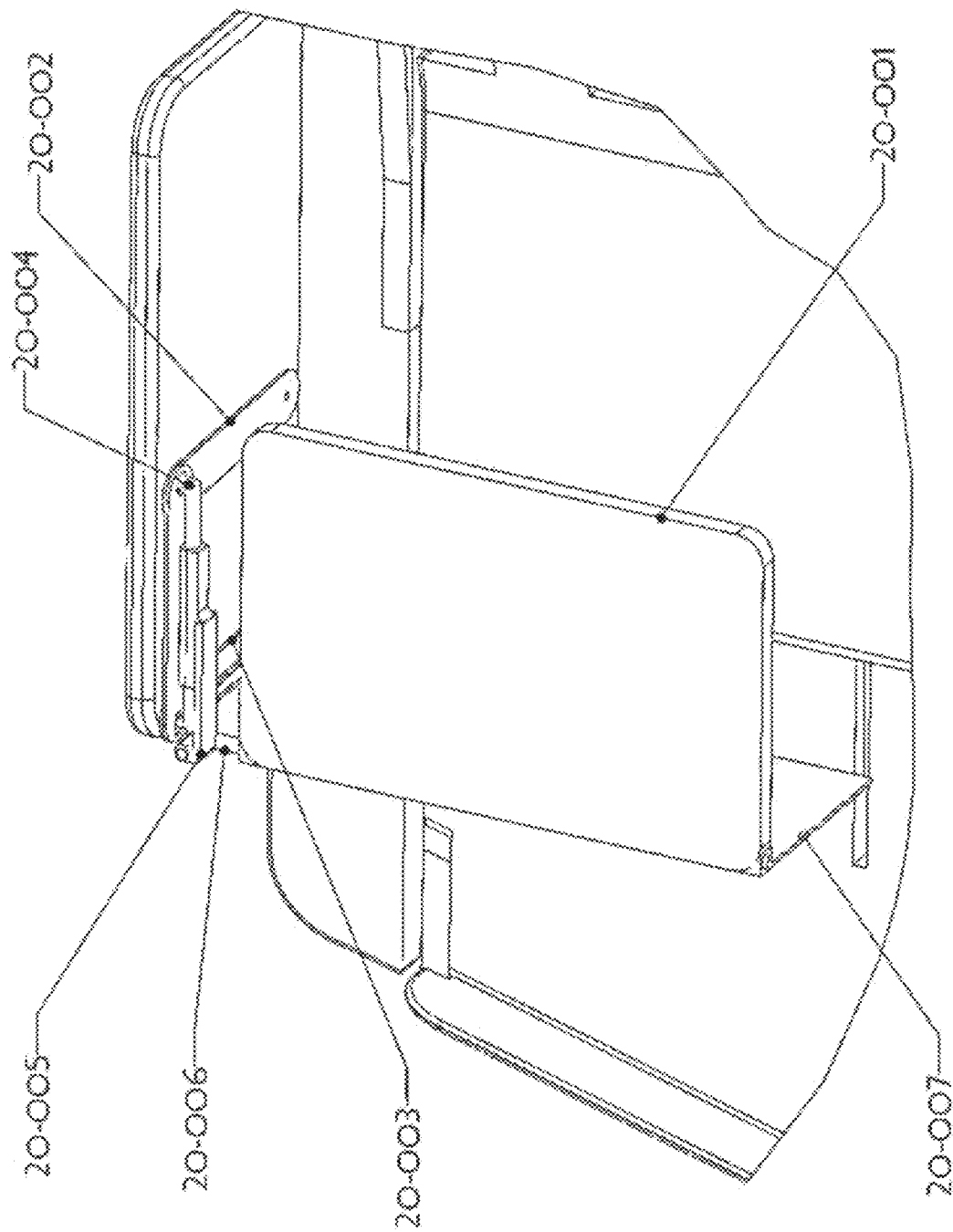
Figure 3:
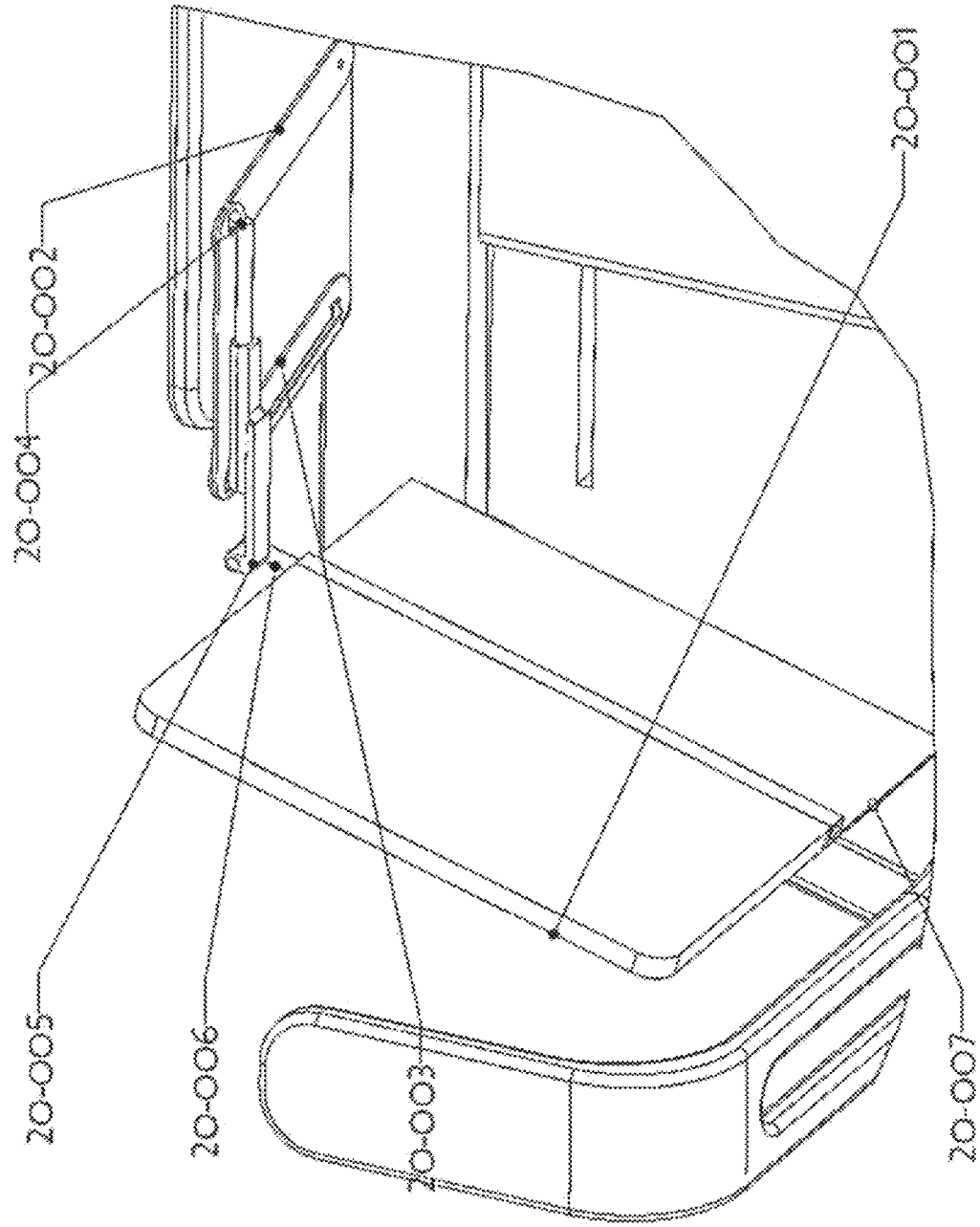
Figure 4:
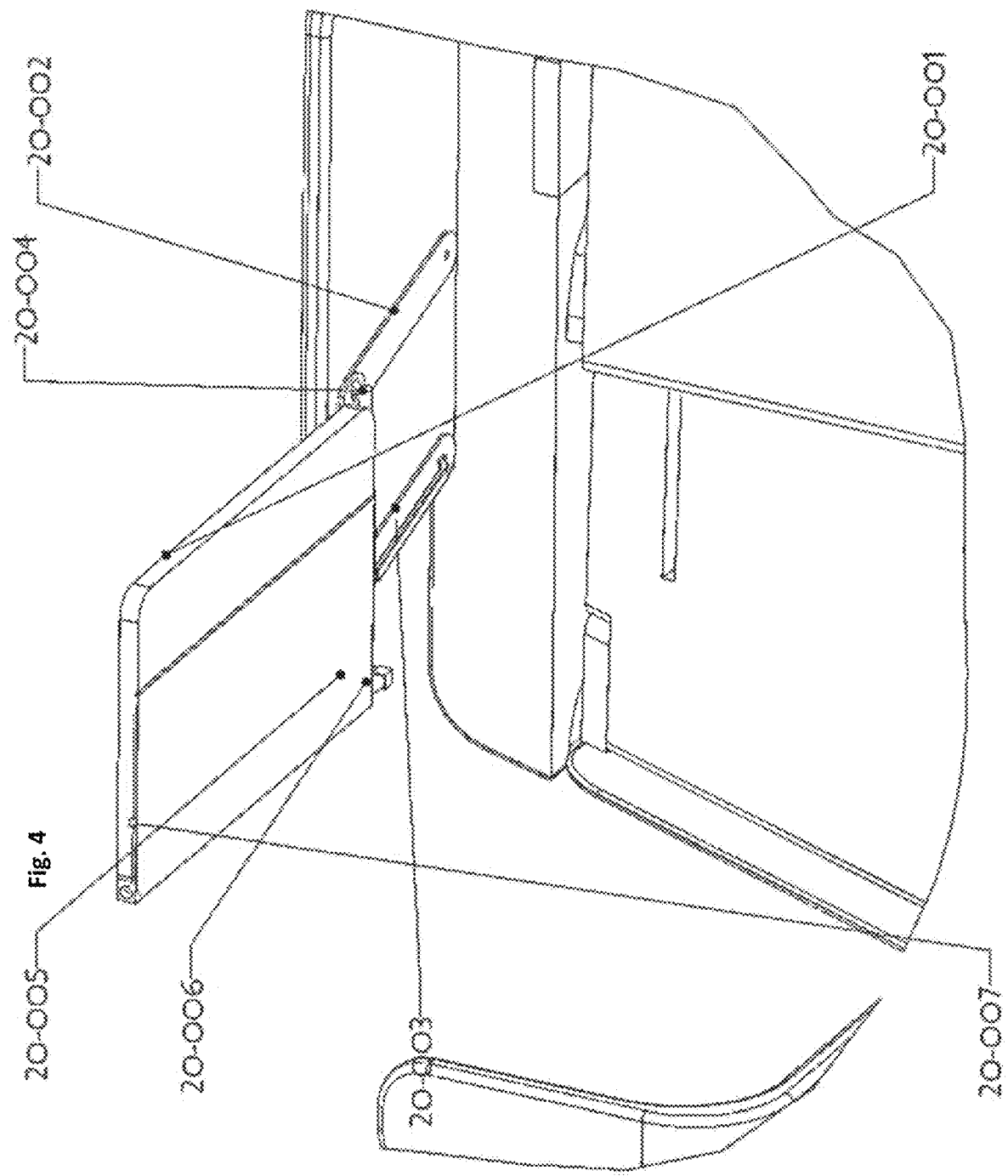
FIG. 4 illustrates the moment about the third pivot member relative to FIG. 3 so that the screen and the tabletop are now aligned with the side of the air sleeper. Such a position could proceed storage of the tabletop at the side of the air sleeper space.
Figure 5:
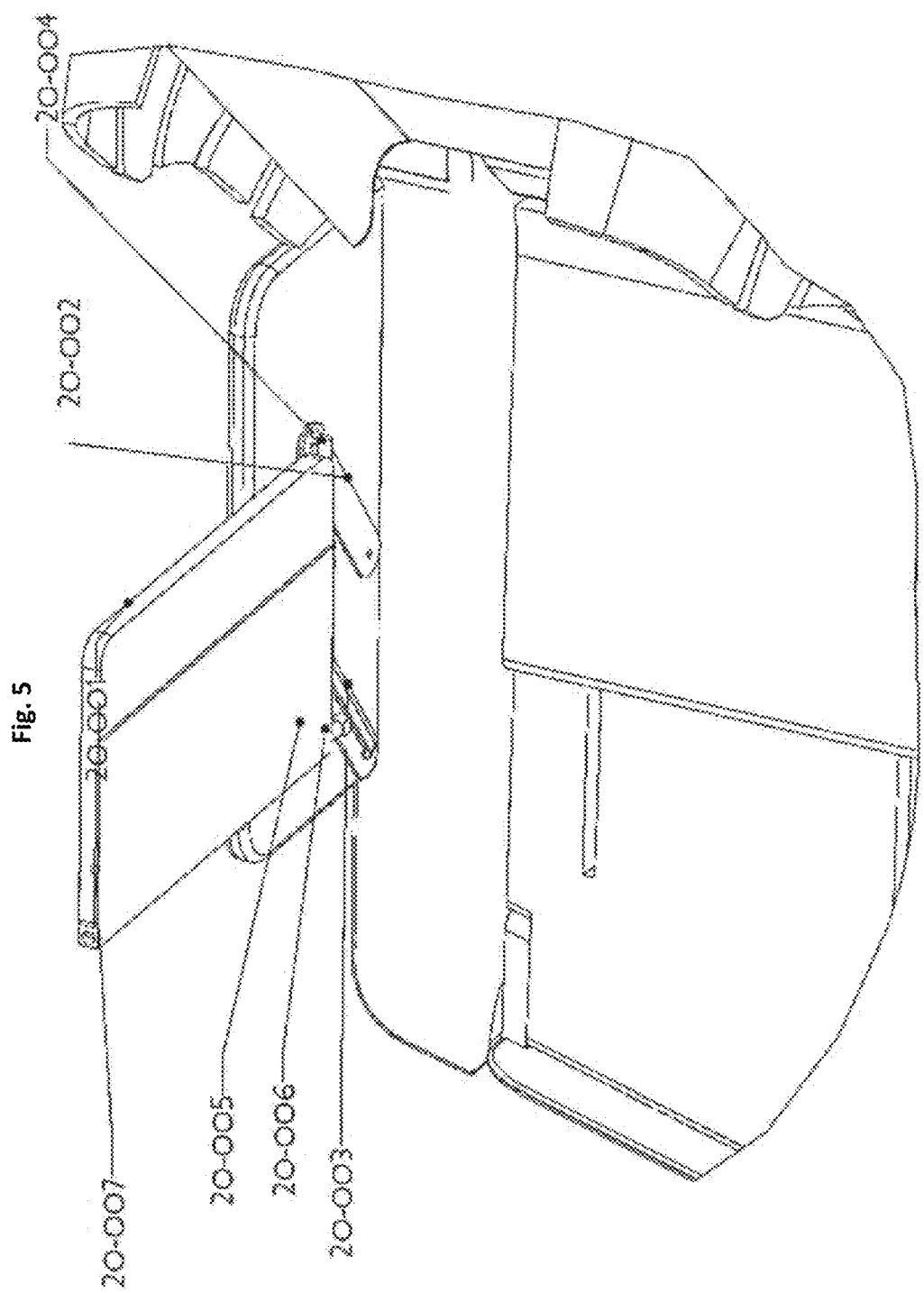
FIG. 5 and FIG. 6 illustrate the process of storing the tabletop into the side of the air sleeper seat space.
Figure 6:
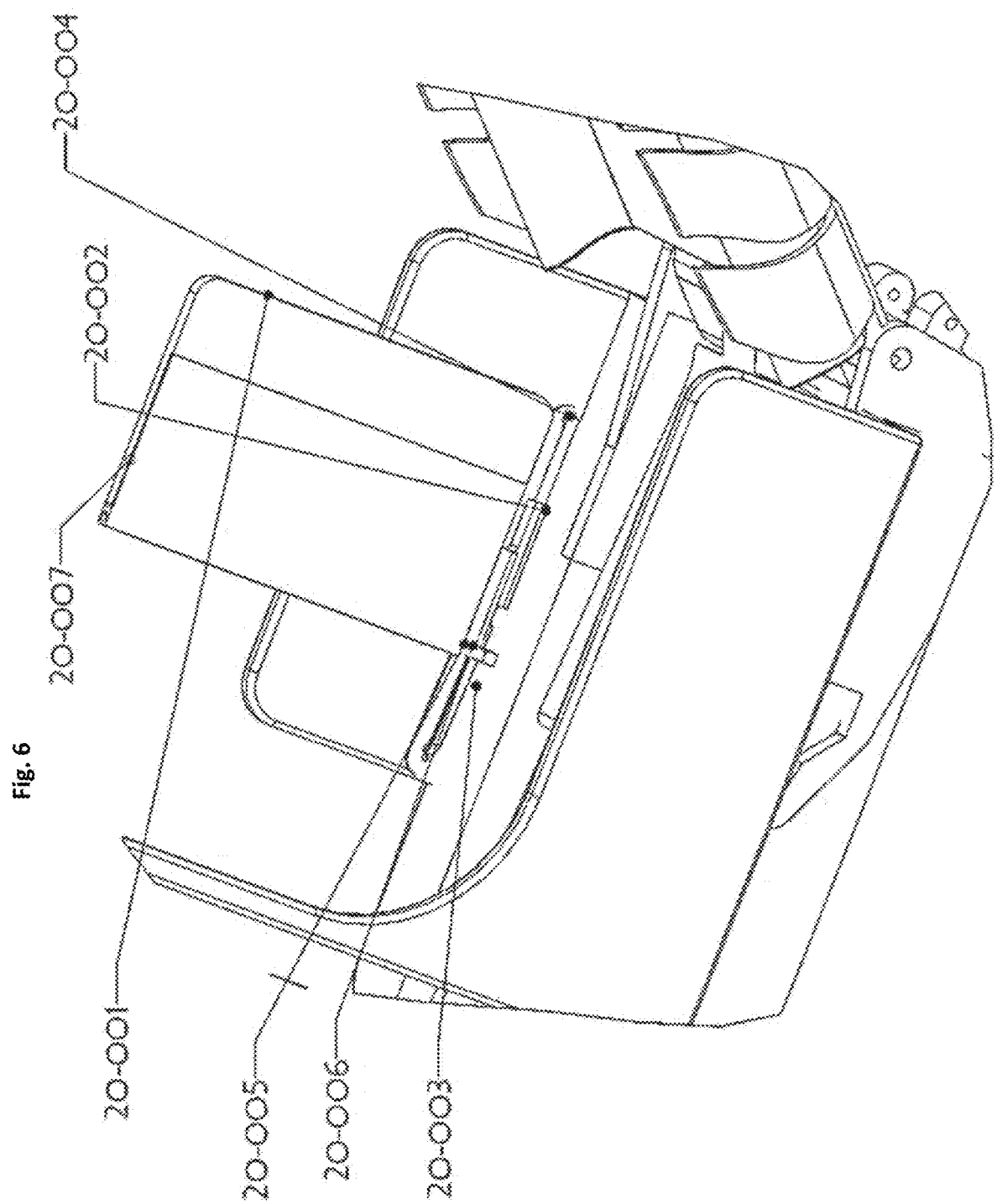

This embodiment of the tabletop is designed to fold into the side of the air sleeper seat. As may be seen from FIG. 5, 6.

It is often useful to have a privacy screen at the front edge of the table as in conventional tables where a tablecloth is used to hang over the edge of the table. Moreover in common use desks have a front surface in front of the working surface to offer privacy to the user. These concepts are useful in the design of the present invention in this embodiment. Notably the privacy screen may be of a flexible materials such as a fabric curtain or may be stiff or semi flexible.

Figures show the use of the tabletop as a screen for privacy as well. For this the tabletop is rotated through 90° so that it is vertical on your vertical and across the occupant seat. It will continue to have below it the privacy screen, which results in an extended privacy screen surface.

In addition considering that it may be useful for the occupant to have the privacy screen at the edge of the air sleeper cabin space bordering the aisle, the mechanism proposed herein allows the tabletop now in a vertical position and also the privacy screen to be rotated about a vertical axis to be parallel to the aisle. Moreover the sliding and pivoting mechanisms proposed can mold the screen right to the edge of the aisle to maximize the space that is protected by the privacy screen.

Another function of the proposed embodiment of the tabletop, is that it can be articulated forward and down so that it clears the knees of the occupant but provides a horizontal tabletop surface at a lower level for ease of service by service providers, and thereafter raised to a convenient height and position by the occupant. Notably such a articulation can be effected by a handle attached to the front pivot arm in this embodiment and multiple position locks that allows the table to be locked in different positions as it swings forward and slides forward.

In many variations of this embodiment there will be end stops to ensure that the table maintains a appropriate orientation and pivotal motion or sliding motion is limited to ensure such performance.

Projector Alignment yet another feature of the present invention is a mechanism for aligning a projector which is mounted on the seatback and is enabled to focus on a fixed screen regardless of the position of the seatback. The invention uses the vertical as a reference-derived from gravitational direction that comes from hanging the projector mechanism from above, and the angle of the seatback. As may be seen from the diagrams in FIGS. 8 and 9 the parallelogram illustrates how using a predetermined fraction of the angle of the seatback along with the vertical/horizontal will allow the angular motion of the projected direction to be what is required to focus on the screen. A fixed angular displacement can be added to ensure that screens at any fixed position can be addressed by such a mechanism.

Such a projector alignment can be used for screens that are derived from tabletops or on screens that are using other mechanisms deployed in front of the occupant.

Another embodiment of the projector functionality, senses the distances of different parts of the surface for projection from the projector and using transforms well known in the art modifies the image so that for the viewer the image appears to be on a flat surface orthogonal to the viewing direction. Such a surface can be a curved surface or a inclined surface relative to the orthogonal plane to the direction of viewing of the occupant.

Considering that in many orientations of the occupant, the occupants reach ergonomically cannot be anywhere near the screen. Therefore, an additional embodiment permits gestures of swipes and clicks in free space, based on infrared and other sensing technologies well known in the art in a predefined space in front of the occupant. This will permit the occupant to control the screened visual stimuli without moving from a comfortable position in the occupant support. Such sensing technologies could use a plurality of direction and distance sensing features scanning the noted predefined space. In some embodiments can also include typing "typing" in free space ahead of the occupant with finger movements aligned to the projected image from the line of sight of the occupant. Again transforms are well known in the art to transform the movements of fingertips of the occupant in Euclidean space to the desired movements for addressing the projection on the screen—for example typing or swiping or other movements with predefined interpretations.

Kick Drawer for Storage

The embodiments disclosed herein have a drawer for storage of large items of cabin luggage.

In conventional commercial aircraft cabin luggage is stored in overhead compartments. S such storage is both inconvenient and unsafe. Particularly for people smaller stature lifting heavy baggage above head level and storing it in the overhead baggage compartment is not easy and can even cause injury. Moreover, if such overhead luggage compartments open during flight the result could be serious injury to passengers below. Therefore an alternative storage arrangement is provided in this embodiment of the invention where baggage is stored below the passenger seats. Considering that there is a long space extending from the aisle in drawer is used in some embodiments using a belt as well for storage at the level of cabin baggage. The figures sure the process of using this in another feature of the present invention where a kick switch is used for both opening and locking the drawer. This makes it easy for the occupant to store his/her baggage without even bending down to open and close the bin.

Yet another embodiment has a ratchet arrangement for the belt inside the drawer. When the drawer is kicked shut with a (heavy) bag on the belt, when the drawer is seated and cannot move further in, the momentum of the heavy bag will pull the belt to move further down into the drawer with the bag so that space is now available for the next bag at the end of the belt near the front edge. When the drawer is opened however and stops at the open position with the same heavy bag on the belt the bag does not slide forward and therefore the next bag can be placed at the end of the belt.

A switch reverses the ratchet at the end of the flight. This can be manual or electronic with a central control. When the ratchet is reversed, the momentum of the bag is allowed to drag the belt forward towards the front but not backward when shut, therefore bags are shifted forwards for easy removal.

Side Screens for Privacy yet another embodiment of the present invention as noted herein are privacy screens on the sides of the upper tier of the air sleeper wherein these pop-up screens are enabled to rise up when the passenger reclines to a flat bed position. They can also be independently actuated by the occupant in desired to offer greater privacy at any time.

Economy Seat with Full Recline—Adaptive Support Seat.

The challenge in full recline seats to become near flat beds but at a recline angle rather than horizontal, is that the passenger tends to slide down and it makes it very inconvenient as passengers will find themselves on the floor if a steep incline of the seat bottom is offered. However, particularly in economy class where there is limited space, there cannot be low angle reclines. The angles need to be steep at the economically feasible pitch or seat spacing. The present invention offers a solution. The seat bottom and/back has lateral elements that are hinged near their lower edge (pivotal) and in some embodiments spring loaded to stay flat and in other embodiments spring loaded or otherwise oriented prior to occupant contact, to have the crests of the pivoted elements to be elevated so that a orthogonal loading to the surface of the seating surface pushes the crests down and flat with the seating surface, but a parallel loading to the seating surface pivots the elements out or in some cases simply maintains them in the initial open position so that the occupant encounters a reactive force in the direction parallel to the seating surface as the occupant tends to slide down the surface due to gravity and an inclined seating surface. One of the key roles of these elements therefore is to support the occupant when there is a loading as in the occupant/passenger that attempted to slide down ie parallel to the seating surface, the lateral elements engage different points on the occupant' body and rotate upwards (and in some embodiments maintained in the initial rotated "open" position) thereby the crests of the elements creating a support from moving downwards. These lateral elements may be made with soft edges to be comfortable but still supportive. They may also be fluid filled or gas filled to provide just the right force, with an external pressure monitor with an optional pump/release valve. They could also be fluid filled with connections between the elements for viscous fluid flow to equalize pressure. There could also be spring loading parallel to the seating surface so that the elements with higher force are depressed and the loading force is equalized. Some embodiments may have a gas filled circuit among a plurality of the lateral elements that equalize pressure to minimize "Hard spots" on the supports. Some embodiments have separate pouches across the width of the elements with connections for the fluid between them with viscous loading so that the pressure equalization is gradual. Yet others have manually controllable valves for the connection channels for fluid between the lateral elements and/or between the pouches on a single element (if such multiple pouches are installed) so that the occupant can stop the flow at the optimal differential pressure between the fluid chambers for comfort. A spring loading of and any or all of the gas filled or fluid filled structures noted above may also serve as cushioning in the direction orthogonal to the seating surface as in conventional seating surfaces. FIG. 18, 19, 20, 21 illustrate the operation of the adaptive support seat. Some embodiments may have a single row of lateral elements placed near the lower edge (front edge of the seat bottom) that is designed to engage the protrusion of the gluteus-maximus of the occupant which will protrude when the occupant has legs extended down.

(PCT/US2009/000342) As shown in FIGS. 38-45, 46A, 46B, 46C, 46D and in the exploded view of FIG. 47, the vertebrae that attach the back fins to the spine may be slidably attached to the spine so that the vertebrae can slide along the spine in a controlled manner. Such control can be achieved by having co-axial spools of different diameters that spool in cables that are attached to each of the vertebrae See FIGS. 47,48, 49. So that it achieves the differential movement of the vertebrae required for the adjustment of the fins for the comfort of occupants of different height. I.e. the thorax and shoulders of shorter occupants will be accommodated by spooling in the cables (there will be greater movement required for the top vertebrae than the bottom vertebrae and therefore the differential diameters of the spools). The Vertebrae may have a spring loading relative to the spine or simply between the vertebrae to release the cable as it is un-spooled for taller occupants. The spool can be controlled with a lever that moves the spools over an angular displacement and a friction lock or other mechanism can be used to maintain the cables in a desired position. In order to accommodate the width of different occupants each of the fins may have air filled cushions that are inflatable/deflatable to provide the required lateral support along the height of the seat bottom and back. Such air-filled cushions would be useful as pillow pads as well for head of the occupant. FIG. 47 also shows a version of the spool with differential diameters for retracting the vertibrae. FIG. 48—Shows the structure of the Spool for seatback height adjustment and the pivot mechanism in one possible embodiment. 113A—Holes allow cable attachments to each of the ribs from the spool. Different radii of the spool for differential movement of the ribs is catered for; 113B—Splined cylinder; 113C—Axle with keyway for pin; 113D—Pin that rides in a keyway in axle; 113E—General housing that encapsulates the spool housing and the back pivot assembly. May have a structural function; 113F—Two symmetrical spools that rotate through 90 degrees to pull in or let out the cable controlling the rib positions; 113G—housing for the spools also have in this embodiment the support for the arm rests; 113H—Mechanism for back-pivot angular adjustment. retracting the pin in a key retracts a splined or geared cylinder that engages the section fixed to the seat back and coaxial with the splined or geared cylinder thereby releasing it to move over an angle. Releasing the pin will engage the splines or gears with the co-axial section attached to the seat back, thereby locking the seatback in the new angular position; 113 I—The spool housing showing the position of the spools with different radii for each of the ribs; 113 J—Extension to housing to attach a lever that can pivot at this point and be attached at its end to the pin, thereby allowing actuation of the pin by depression of the lever; 113 K—Axis of the spools may be actuate by a long arm and a lever on the side of the occupant; 113 L—cut out for the spine. In this embodiment it is an angled architecture for impact deflection properties. FIG. 49—Spool exploded view 114A—Axle with Key-way for pin. This axle may also be splined to the cylinder and to the part that is attached to the moving seat back. 114B—Splined cylinder (or keyed) to engage axle with geared end that engages the end of the cavity on housing attached to seat back. 114C—General housing that may substitute for or encapsulate the spool housing and may encapsulate the back pivot assembly (for the seat back motion) It may also have a structural function. 114D—Housing for spools also have in this embodiment the support for arm rests. 114E—Axis for the spools may be actuated by a long arm and lever on the side of the occupant. 114F—Two symmetrical "spools" that rotate by about 90$to pull in or let out the cable controlling the rib positions. 114G—Extension to housing can be used to pivot a lever that is pivotally attached to the Key, thereby leaving the key to move in and out, and thereby resulting in the engagement and dis-engagement of the gears between the cylinder and the cavity of the housing attached to the seat back. The occupant can thereby control the angular orientation of the seat back by depressing the lever and rotating the seat back up or down. There will in many embodiments be a spring loading against the weight of the seat back. 114 H— Cavity for cylinder with spring loading to push geared end of cylinder towards the part attached to the seat bottom. The cavity at its other end has a smaller diameter that accepts the axle and has a corresponding keyway as on the axle. The Key with a head that can pull the cylinder rides in the key-way; 114 I—Pin that rides in the Key way on the axle.

Some of the above embodiments have ribs that can be widened or narrowed by the occupant and locked down. Such embodiments will use a lateral sliding mechanism to change the position of the lateral side wings on the ribs if used in the embodiment. The occupant may choose to narrow the width of the seat and the wings for additional lateral support particularly while sleeping.

Some such embodiments have a (sliding) lateral rib located to be behind the chest and below the level of the arms and adapted have its width narrowed to support the occupant at one or both of the arm pit level or laterally.

The architecture of the seat back with a spine and lateral ribs in the above embodiments may is some embodiments have the laterally spaced pivoted support elements as in FIGS. 18 to 21, where each of the sets of lateral elements is on a lateral rib.

In such embodiments of FIGS. 18 to 21 with the spine and lateral rib construction as noted above, some embodiments may have the lateral ribs contoured to accommodate the lumbar region and the upper back, and adjusted by the occupant for its vertical position with the sliding mechanism noted. The pivoted supports may in still other embodiments be inclined to the lateral direction ie angled on the ribs so that they pivot out and up rather than directly up.

Single Beam Architecture for Airsleeper Units

The present invention discloses alternative architectures for the upper and lower AirSleeper units. These embodiments offer a single beam structure to support the upper as sleeper units also serving as a wall between two adjoining lower AirSleeper units, and attached to a single AirSleeper. The benefits to such an architecture first dissembled lower AirSleeper units is that the space occupied is less. Even more importantly a wider beam width in the vertical wall offers greater strength. The stair structure and particularly the rear wall behind the stairs attach to the arm rest section/side sleep surface to provide a continuous bracing structure for horizontal forces substantially orthogonal to the axis of the airsleeper occupants facing direction.

It may be seen from the figures that the stairs opposition centrally to the upper AirSleeper. However the stairs are on the side of the lower AirSleeper. This results in a synergy in utility between that of the upper and lower AirSleeper occupants.

The positioning of the stairs vis-à-vis the upper occupants, needs to have a support railing or banister that follows the steps but displays laterally for the shoulder position vis-à-vis the hip position. This is achieved in the embodiments as seen in FIG. 29 for example.

This embodiment also offers a standard seat assembly that can be inserted into the upper all the lower AirSleeper.

As may be seen, the lateral latches shown between the lower as sleeper units 21-002 can support tensile and/or compressive loadings in addition to the vertical loadings of the upper level AirSleeper units.

It may be necessary in some embodiments of the AirSleeper to have stronger bracing between the bottom ends of the lower AirSleeper units. The embodiments of FIG. 26 with a bracing structure on either side of the seat pan in the lower AirSleeper unit would be used.

Virtual Navigation in Real Spaces

This disclosure incorporates by reference in its entirety the disclosure of U.S. Applications 60/787,444 and Ser. Nos. 11/730,161, 14/203,088, 14/708,594. Particular sections are explicitly disclosed herein with numbered paragraphs.

Navigation in a Real Field would be an application where the 3D virtual navigation with the device in a real 3D field in real time live programming at any location with possibly multiple sources from a network of members. Such members may be Sources or Users. The Sources provide live programming and will have one or more "World Camera(s)" (and/or "World microphone sets" for audio mono, stereo or 3D surround fields) that is aimed in the direction of sight of the Source to see what these members see (or hears) Multiple World Cameras or Microphones can give a 3D virtual space rendition. The User members have interface devices to receive the Source programming and navigation devices to navigate the 2D or 3D field of the programming. Such navigation may be with Mice Joysticks or may use the Intelligent Eye (U.S. Pat. No. 7,091,928) for such 3D navigation directly by using the eyes.

In such virtual navigation of real fields an Active Network of members, Sources agree to share their programming with Users. The same member may be both a Source and a User. Arrangements among such members may be reciprocal or for a fee. While such a network is not necessarily active and may simply transfer information from a source node to a user note, an active Network with distributed processing of video and audio information will in most cases provide the distributed computing resources to enable the operation of this infrastructure.

In addition the User may be a Source Member of a Network and would therefore have the apparatus for this. The device headset may therefore have a pair of cluster "World" cameras pointing in the direction of the face of the user (field of view of the User) to capture 3D video inputs for use of the Source Member for distribution on the Network, or recording on a local device as off-line programming.

Wearable Computer

This embodiment will also have an organizer and other basic personal mobility resources.

The Network

The Network provides multiple Sources for real time video at known physical locations derived from Source members in the Network, thereby enabling members of the network to navigate among these source points and even to interpolated points between them. Considering that source points may be moving such movement will provide additional information for the reconstruction of fixed objects in the local 3D space of users in any local neighborhood.

Therefore a User Member may choose a physical location or a special interest location and the Network will locate Sources in that location that wilt appear for selection by the User on the interface. This may be in the form of icons in a 3D field of real time programming derived from a Source. I.e. The field of view of a Source that is available on the World Camera may have icons representing the locations of other Source Members that the User Member can select and "hop" onto. The locations of these Members may be determined by the Network using GPS or triangulation methods with radio connections and many other well established approaches in the background art. Selection of other Sources by the User Member may be by clicking or V-clicking on the desired Source. This action will transfer the User Member to the Source World Cameras and microphones of the selected Source Member. Such navigation may be induced by visual or audio stimuli from the currently selected Source Member.

For example the preferred embodiment can be used for interactive access to real video (and audio) fields through the Network. To enable such access the device will have a menu that can select a local environment (some of these can be on a list of bookmarks or can even be (he native real environment) and the resulting displayed field will show a starting point as requested and several Sources that may be color coded for accessibility, cost, and quality where the user can navigate to and select with a V-click. On selection, the user video display shows the perspective of the selected Source and the user will passively follow the Source unless the Source has wide angle or cluster World Cameras with the Active Network enabled to pan and zoom in this field, in which case the user has some navigational freedom even within one Source. However, the remaining nodes may still be displayed for further selection and navigation thereto. (there will be menu options to turn off these node displays as well).

The user can therefore hop from one Source Member to another and see (and hear if enabled by Source) the perspective of the Source. In addition if enabled by any given Source (usually for a fee) interactive dialog with the Source and even requesting the source to "Show" a preferred field of interest.

This will amount to virtual navigation in a real field.

The Network may be hosted in part by a community of distributed wireless hub providers and other network resource providers. Who (possibly for a fee) provide local wireless bandwidth and other hub intelligence and link into the internet. Such an infrastructure with distributed resources will also enable the high computational needs for reconstruction of 3D local neighborhoods and video processing bandwidth. The infrastructure of this invention enables new approaches for TV programming with access for viewers to navigate in the real environments of interest in news or documentaries and even interview (possibly for a fee) the Source members of choice in the relevant local environment.

The Network in the preferred embodiment will comprise a distributed network of wireless bandwidth providers (Providers) that for a fee from the Network administrator will provide bandwidth locally to User Members that are a part of the Network. User Members will pay for bandwidth bandwidth can be hot spots in a local region within a city where many such local regions provide "cellular" coverage for neighborhoods and even cities. These may be substituted for or supplemented with conventional cellular bandwidth with standard billing to the administrator and indeed satellite bandwidth in remote locations. The Providers may be required to have installed in their hubs the computing infrastructure to stitch together the available Sources in the local neighborhood and have the intelligence to accept and hand off dialog with Sources/Users as they move through local neighborhoods. Providers in this preferred embodiment will initially provide bandwidth for a fixed fee set by the Active Network Administrator, and then after the initial probation period set a rate based on the market. Local providers will compete for providing bandwidth. Users will have options in selecting lowest cost or highest available bandwidth (and quality) options when selecting the Providers. Such bandwidth selection may be a background process that is set by the User. Users may select from multiple Providers (which may be other Users or Sources) based on possible fees such Providers may charge through a Network Administrator. This arrangement forms a new Business Model for Distributed Bandwidth.

An additional embodiment incorporates stitching algorithms for interpolation of fields available in the Network as source nodes of other users, thereby giving the user a continuous or near continuous range of view points and fields even between the available sources. As he Sources are moving the Active Network can recreate the fixed 3D local landscape and use that video information for interpolation for navigation of users. Such stitching together of local landscapes and city scapes can allow User Members to physically navigate from available Source Users in one local neighborhood to another using "Real Maps" created by this interpolation of the fixed landscape. While such interpolation will not be able to give perfect views, the user has the choice of using the available Source nodes or an interpolation or a combination for zooming out to encompass a wide panorama. Such interpolation processing may be enabled by distributed processing on the Active Network given the computing resources needed for each of the neighborhoods. The Network will need intelligence to locate the physical location of the sources. These can be done in some embodiments with GPS and in others simply using triangulation from the transmit points of the sources to the recent hubs or host devices that the device has latched onto recently.

If interpolation algorithms are used these will also have interpolated locations from the source locations. To supplement this, there are well established web based approaches to find physical locations of sources on the internet.

Alternative and Additional Embodiments

Embodiments of this invention have Source Members that comprise one or more Sources with one or more cameras (ie cluster cameras). This invention includes several types of Source Members including source members adapted to move with humans, and also source members that are Machine Source Members (MCMs). Such MCMs are in some embodiments in the form of robots wherein the one or more Sources they control are on Source Vehicles such as autonomous vehicles or flying or surface drones. Multiple such Source Vehicles in some embodiments have coordinated control by the MCM Source Member For example, in some embodiments a plurality of drones fly in swarms, wherein the flight paths of members of the swarm are coordinated with each other by the MCM. Thereby moving their one or more sources in trajectories that are predefined by the MCM which in some embodiments will be in real time. Sources on such a swarm of drones or autonomous vehicles in some embodiments will each construct light fields with their motion and related position over time and the MCM is enabled to aggregate these light fields for deconstruction and reconstruction of additional views by available computing resources that may be available in the MCM. Some embodiments of such MCMs that are connected to the Active Network are in some embodiments instructed by the Active Network on the deployment of the drones or autonomous vehicles to coordinate the construction of the respective light fields of the Sources to generate views by the Active Network. Therefore, in some of these embodiment the Sources of a Source Member are each separately mounted on a support and the motion of each Source for direction of view and position for each frame is monitored and controlled by the Source Member. Some such embodiments have fixed organization of the Sources relative to each other and they are all enable to move in concert. In other embodiments, each of the Sources has a trajectory controlled by the Source Member which may be an MCM. Some such embodiments have Sources each mounted on separate vehicles that are enabled to move. Some embodiments among these have each of the Sources mounted on a drone or a controlled flying vehicle or autonomous vehicle. Some of these embodiments have the Source Member MCM control the formation flight of the drones to create a composite light field. Some embodiments deconstruct the frames from each of the cameras, and storing the image, the camera identity by Source Member and Source, the GPS location and direction of the camera and time, such that the resulting data structure is queried to extract the specific images and their parent light fields for reconstruction of a specific view with light fields from a plurality parent light fields that are part of the composite data structure. A factor for combination of parent light fields is aging and for some views near real time imagery will be needed. In others clarity will be a priority. The recombination of the parent light fields from the aggregate light field will be determined by this requirement. Each User of the Active network may preset time sensitivity and clarity preferences that will determine the views presented of any location and related field of view. For the case of real time virtual navigation the reconstruction may have fixed landscaped as in real maps reconstructed with a set of parent light fields with deep time variation. Construction of a view from light fields is well known in the art.

In all these embodiments the fields are available to the Active Network to reconstruct interpolated views, 3D landscapes or Real Maps. In yet other variations of this embodiment the Source Member has control of what aggregate light field is constructed in time by deploying the vehicles along pre-determined trajectories in either absolute position or relative position to the location of the Source member, to build the required light fields in a short space of time ahead of real time for anticipated 3D visualizations demanded by the Active Network. Control by the MCMs of the autonomous vehicles or drones with mounted Sources in some embodiments are transferred to the Active Network which makes deployment decisions and travel paths and view directions depending on an inferred preferences of User members. In some embodiments, the travel paths of the Source vehicles of any MCM can be adaptive in that they are not parallel with each other or bear any fixed relationship to each other but change over time under control of the MCM or Active Network to generate a target density of light fields in any region of the space that is covered for view. High density in a region of the aggregate light field can offer more quality Synthetic Sources (sources between actual sources reconstructed from the light fields) In the extreme case one or a group of Users determine the composite field created by a predetermined set of vehicle mounted Sources that are defined to create the desired field for the use of the one or group of Users. This will typically be for a fee to the Active Network or the Source Member. In such embodiments, for the real time Users, control the generated field and its time trajectory allows the 3D immersion desired by the User. In some of these embodiments the User is the leader of a virtual tour or exploration controlling the Sources of the Source Member and fees may accrue to that leader from the followers in addition to the Source member and help mitigate the cost to the leader of controlling the vehicle mounted Sources paid to the Source Member or the Active Network. Another additional embodiment comprises the noted real 3D field in programming generated from light fields at a location with multiple Sources from a network of members, where the aggregate field comprises the fields generated by the perspectives of multiple Sources where such Sources comprise one or both of cluster cameras; and moving cameras, further where in addition the reconstituted cumulative field includes occluded regions from some of the Source fields of view but are reconstituted from the aggregation of the available Source fields, thereby offering "See through" vision if so chosen by the Users or the Active Network for the reconstitution of the aggregate field with the fields of view from the Sources viewing the occluded spaces.

Another additional embodiment offering an improvement in these embodiments using the information in the available light fields would result from the combination of the restructured 3D landscapes as noted with the additional light fields available in real time to "update" the 3D model particularly with moving objects. Considering that the locations of the fields of view of the source cameras will at different points in time potentially have different lighting conditions, such as in open spaces where the position of the sun would determine the lighting conditions on the objects and landscapes in the fields of view of these cameras. The light fields generated from these frames or perspectives on an additional input parameter for the deconstruction and reconstruction of views of 3-D landscapes or even 2-D imagery that may be created from the aggregate light fields of these multiple source cameras over a period of time.

Yet another embodiment would help some sources including light emitters adapted to provide one or more colors of light and attached besides the camera, such that these light emitters attached to the cameras can provide lighting not just for the attached camera but also for other cameras in other sources to provide varied lighting conditions for the capture of frames and light fields by the respective cameras in multiple sources in a particular neighborhood. Therefore, these embodiments are not limited to a single Plenoptic Function and if there are occlusions a single related light field.

Such lighting conditions in some embodiments are predetermined and programmed with timing with natural lighting or with light emitters attached to Sources to create the necessary light fields for optimal deconstruction and reconstruction of desired fields for the active network. Light emitters in yet other embodiments may also be deployed in separate autonomous vehicles and controlled by the MCM and in some embodiments the Active Network to provide the desired lighted surface topologies desired for the constituent light fields from the Sources available.

Yet other embodiments will have the programming of lighting conditions predefined by the Active Network based on demand from users compiled by the Active Network. Yet other embodiments would incorporate a business system for costing and therefore pricing and billing users for the service that has such optimized capture techniques for the constituent light fields which includes the additional lighting sources and locations of the sources and/or their trajectories in space.

Yet another embodiment has multiple sources with cameras targeting a scene or landscape where the cameras are set to have different focal lengths and therefore capture different slices in the Fourier domain of the 4-D light fields, thereby enabling refocusing ex post of the light fields computationally by the active network. Some such embodiments would have us single source with multiple frames captured in quick succession with different focal lengths of the camera to create the multiple slices in the Fourier domain of the 4-D light field.

Furthermore, embodiments of this invention are not limited to a 4D-light field of a convex space as subject. Some embodiments of the invention will have sources that are enabled to position themselves behind occlusions and therefore provide additional constituent light fields to create an aggregate light field that includes the occluded regions for reconstruction of views that are enabled to view target objects scenes and landscapes not simply for reconstruction using light fields from sources that are not blocked by the occluding surface but a more complete selection of possible constituent light rays from such sources placed behind the occlusion therefore in some cases reconstituting one or more 5-D Plenoptic Functions.

Yet other embodiments, have the active network detecting occluding surfaces and in preprogrammed motion sequences for Sources controlled by MCMs are enabled to have trajectories of motion, or get positioned in such spaces behind the occlusions to construct the consequent light fields for the aggregate light field for reconstruction of the desired views by the active network.

Yet other embodiments have electromagnetic field detection sensors mounted in one or more MCM controlled drones, which sense electromagnetic fields in the vicinity of their flight trajectories, and wherein one or more drones are battery powered and have inductive coupling coils attached to said batteries, and wherein the drones are constructed to enabled to locate their inductive coupling coils in the vicinity of a detected external electromagnetic field. In some embodiments, a swarm of drones with one or more drones so endowed will have such endowed drones transmit the location and the images of the electromagnetic field source and the MCM and in some cases the Active Network identifies the nature of the electromagnetic source and instructs the drones to park in specified positions to locate their inductive coupling coils in suitable positions to generate a current is such coils and recharge their batteries. A large swarm of such drones can scout out such sources with their source cameras and EM sensors when power in drones is running low and direct one or more drones to the recharge opportunity.

The frames of all the cameras of the Sources may in addition be classified by location, direction and time and be selected to from resulting dense field for ex-post interpolation or focusing. The frames if indexed by time can also be selected from time ranges and may be used for selection of the frames if needed if the neighborhoods are changing.

Some embodiments have icons for navigation to the view point of the related icon in the field of view of the current Source presented to the User, placed on that field of view at the locations of available Sources in the occluded regions which offers a better context assessment by the user than such icons placed in those locations but with the occluding objects preventing the actual view of the locations themselves from these occluded Sources. Moreover, yet other embodiments use the constituted light fields generated by such sources that are in the occluded regions to create an aggregate light field and then reconstruct views from one or more positions even between the available sources in the occluded regions or Synthetic Sources. Such Synthetic Sources may be accessed for use by the user by locating icons on the field of view presented to the user, of the scene. Such icons can in some embodiments be colored differently to represent the occluded regions. Moreover, such icons can cover the space representing several positions where reconstruction of such views are possible from the aggregate light field. Therefore, a selection on the icon covering a space can provide views from one or more Synthetic Sources that are available in the space covered by the icon depending on where on the icon the selection is made. Such multi-point icons may be color coded to differentiate them from single point icons. However, a plurality of single point icons can be used instead for selection therein for a view from the position of that icon in the current Source view of the User.

A time 3D history or documentary of any such neighborhood is constructed in yet another embodiment by reconstructing the fields from a narrow time range of frames using position, and direction information in their fields of view.

It will be possible with these embodiments to immerse the User in the past with the entire 3D neighborhood. This would amount to virtual navigation in time and space.

These embodiments may be used to build Real Maps or 3D Landscapes or interpolation of views between view points as previously noted but may also be used directly as fields for manipulation ex-post by User Members for ex-post focusing the field of view in an available field.

The ordered time sequences of the generated fields can use cluster cameras to generate wide fields for translation of the perspective of the User with icons representing the available points—and in combination—regions from which such views are available. Such features will be useful for immersive movies. Some embodiments have multiple Source Members that offer different perspectives. Each of the Source Members is some embodiments will have multiple Sources organized to follow predetermined paths that could be arrays allowing ex-post (in the movie) User focus on items of interest and or the perspective of interest. In some embodiments such Source Members can be MCMs and Sources are drone mounted to follow predetermined trajectories to construct predetermined planned aggregate light fields that define the immersive movies.

In some embodiments the individual cameras in the noted camera cluster are arranged in a row and their motion ie the motion of the Source is orthogonal to the row of cameras and therefore the time sequence of frames from the cameras generate an array of views that generate the field available to the Active Network for reconstruction of views, landscapes or real maps.

Further embodiments have Source cameras with complete 360 degree fields of view. This may be implemented with camera clusters as noted.

Some embodiments have their camera clusters organized as rectangular arrays of cameras to build the required field.

Some embodiments have their camera clusters organized as an elliptical array of cameras to build the required field.

Some embodiments include a Source support for hand held Sources on the Source Member to provide source programming to the Active Network even when said source is not hand held. These supports may allow the use of the Source on a device such as a mobile phone with the camera(s) pointing forward or another pre-determined direction. This may be simply a chord around the neck of the Source member with the camera as a pendant pointing forward.

It could also be a pendant designed to allow the use of the phone screen by the Source Member, while at the same time providing the Source streaming to the Active Network as in FIG. 17.

Authentication with Blockchain.

The active network of the virtual navigation system may comprise a block chain network with nodes including the Sources and Users of the VNS. Therefore, participating Sources and User Members will have copies of the block chain on the clients in the device applications. The transfer of experience through audio and video communication channels in the VNS system from Sources to Users, however can be replicated to many Users from each Source. Therefore, unlike money transactions as used in for example Bitcoin and Ethereum networks, an experience can be shared with many consumers of the experience—the Users.

Unlike a financial transaction, the transaction object structure will contain unique identifying information related to segments of the communication from Source to User. As a User navigates from one Source to another he/she leaves footprints of the path from one Source to the next. For each Source therefore, there is a start time and location that defines the beginning of the segment from that Source, and an end time and in location that defines the end of the segment from that Source. Moreover, each of those segments from the Source comprises data and a unique summary representation of the data such as a checksum we characterize the segment. Also the time duration between start and finish of the segment can be computed. Furthermore, the protocol for communication of each segment will be established at the time of communication (for example in web RTC the SDP exchange establishes the common protocol between Source and User interface nodes).

The transaction structure in the block chain used to authenticate communications in the VNS may in embodiments contain one of the following sets of information or variations thereof, in addition to the standard elements of transaction objects (eg in Ethereum: Nonsc, to, gasprice, gas limit, v, r, s):

1. The start time and location, end time and location, checksum of segment between start time and end time, protocol for communication.
2. The start time and location, end time and location, checksum of segment between start time and end time.
3. The end time and location, duration of segment, checksum of segment between start time and end time.

One or more of such transactions constitute a Block. Notably the systems and units of each of the parameters above must be pre-defined.

An alternative in some embodiments would define transactions with synchronous event capture in fixed periods—say every minute with location and time records and checksums for the period, rather than using the start time and in time with locations. Depending on the size of the network, there may be challenges in the number of transactions and an unreasonably large Block Time constructing and maintaining the block chain.

Notably, with a view to authentication a Source can also be a User, and record segments for self-consumption with the block chain activated for authentication.

Considering that there is a cost in using the block chain, Users may opt to engage the block chain or not depending on their interest in authentication of the shared information in any segment. When activated, the block chain will be appended with transactions with the Source desired by the User. This activation can be achieved at the User interface node which is a client on the active network with the block chain network, with client commands programmed to instruct activating or deactivating the block chain for the current segment. (The blockchain applications for smart contracts may in some embodiments for example be programmed for Ethereum in Solidity with an ABI for a node.js application and use web3.js libraries to interact with the block chain).

Payment for the use of the block chain for any segment can utilize the standard approaches for payment such as in Ethereum.

Moreover, if there is future value in a segment from a Source, Users may wish to pay a price to receive that segment. This price can be set by the Source. The payment can be made in some embodiments on the block chain network such as Ethereum or Bitcoin.

Future value of such segments could vary widely depending on the scarcity or abundance of the segment available from Users that have recorded the segment. If the segment has been authenticated on the block chain the value may be even higher.

The availability of Sources in a particular context or location at a particular time (an event) will vary. For example if an event occurs where there are many Sources that will be greater redundancy in the available local information. On the other hand a scarcity of Sources at the event reduces such redundancy. Therefore, the Shannon entropy of the communications from Sources will vary depending on such scarcity or abundance of local availability of Sources. Rare Sources may have a higher value in the event coverage is important to many Users or even of high-value to a single User.

Recognizing that while the Source to User two way communication for a segment is easily achieved, when there are multiple Users, two-way interaction between the Source and the User will be more difficult. When there is a single User in a two-way interaction with the Source the reverse voice channel segment from the User to the Source can also be part of the transaction on the block chain if the block chain is activated in some embodiments. In the multiple User case text may be used on the screens of the Users interface capturing the reverse channels from Users to the Source. As this is a part of the video record that do can be captured on the block chain in some embodiments.

A related embodiment of an architecture of authentication on telephone calls and videoconferences that uses the same block chain mechanism for authentication of dialogue between 2 or more participants in a call. In the case of a videoconference transaction objects may comprise multiple checksums of peer to peer segments or the checksum of a composite video transfer if individual videos are combined and transferred to each of the participants in a star configuration.

The block chain will constitute multiple transactions and in aggregate these transactions may include multiple segments from Sources to Users in the local space of an event of interest ex-post. The block chain will therefore offer a mechanism for authentication of "truth media". Some embodiments will have smart contracts in the block chain (eg Ethereum) that search for locations in transactions, identify sets of segments between Sources and Users, identified the Users that own the segments (They may have paid a non-zero price for the segments to the Source), and negotiate with each of the Users (the Source may also be a User) for their Ask price for access to their segment. These will then be combined and presented to the requester who may also be on the block chain as a User. The requester may then choose one or more of the Source segments. Notably, if there are multiple Users with the same Source the value of segments from any one of those Users will be eroded (Shannon Entropy). Some embodiments will include in the smart contract the redundancy information on every Source segment in the possession of the Users, so that the User may use this information to recognize the redundancy in his/her Ask price. In some embodiments, the requester will pay for the "gas" or cost for the smart contract.

Search techniques for directional node pairs between Sources and Users for each segment can use established techniques in graph theory and in methodologies for searching large data sets.

The smart contract can be programmed for Ethereum for example on Solidity and compiled to give the Bytecode for the blockchain and the ABI for interface with for example a node.js client server application that has the client interface for driving the application as noted above.

Conclusions, Ramifications & Scope

It will become apparent that the present invention presented, provides a new paradigm for implementing key safety features comfort and convenience features for occupants in vehicles and virtual navigation in real spaces.

The invention claimed is:

1. A system for virtual visualization of a real space comprising:
   a User Member with a user interface comprising a display, wherein said User Member is connected to an Active Network hosted by computing resources to enable a real time virtual visualization infrastructure for a real space comprising a plurality of Sources, wherein said infrastructure is enabled by an internet with at least one digital communications protocol;
   a plurality of Source Members, each comprising at least one of said Sources each comprising one or more cameras configured to provide visual stimuli to the User:
   wherein one or more of said cameras on at least one Source Member are enabled to construct a Light Field between available Sources;
   wherein each of the Sources are at Source Points;
   wherein said Source Points are configured to move;
   wherein the Network derives Source physical location information through their respective Source Members in the Network;
   wherein locations of each of said Sources is determined by the Active Network;
   wherein said system is configured to deconstruct said light fields of Sources and reconstruct light fields for Source Points between available Sources to at least one of: interpolate to construct at least one view at a location of a interpolated Source Point distinct from a location of any of the Sources; construct a 3D visualization; and construct a field of view of a selected Source with reconstructed occluded regions;
   Wherein said Active Network is configured to provide interpolation processing;
   Wherein said Active network generates at least one Plenoptic Function across an aggregate light field from said cameras located at each of said Source points configured to generate light fields from one or more of said Sources.

2. A system for virtual visualization as in claim 1, wherein the at least one Source Member Light Field comprises a light field constructed by the motion of the one or more cameras.

3. A system for virtual visualization as in claim 1, wherein the at least one Source Member Light Field comprises a plurality of Source Light Fields generated by a plurality of Sources attached to said Source Member of said plurality of Source Members.

4. A system for virtual visualization as in claim 1, wherein at least one of said Sources are configured to move relative to its Source Member.

5. A system for virtual visualization as in claim 1, wherein at least one of said Source Members is a Machine Source Member (MCM).

6. A system for virtual visualization as in claim 1, wherein at least one of said Sources are mounted on a Source Vehicle of said Source controlled by its Source Member.

7. A system for virtual visualization as in claim 6, wherein a plurality of said Sources mounted on their Source Vehicles fly in swarms, wherein each of their flight paths are controlled by their Source Member.

8. A system for virtual visualization as in claim 6, wherein the Active Network controls the flight path of said Source vehicles.

9. A system for virtual visualization as in claim 8, wherein at least one of said Users instruct the Active Network on desired at least one of Synthetic Source Points, 3D visualizations, reconstruction of occluded regions, thereby defining the required light field density in a local region of said Aggregate Light Field.

10. A system for virtual visualization as in claim 9, wherein the constituent parts of the Aggregate light field used for the construction of the at least one of Synthetic Source Points, 3D visualizations, reconstruction of occluded regions, uses real time light fields in the region when the field of view is changing over time and include previously saved time lagged light field components in the local region which used in combination increase the clarity of the visualization.

11. A system for virtual visualization as in claim 1, wherein one or both of: a plurality of cameras are configured to have distinct focal lengths; and at least one camera is configured to have a plurality of focal lengths at a sequence of times, thereby capture different slices in the Fourier domain of the 4-D light fields and enabling refocusing ex-post.

12. A system for virtual visualization as in claim 1, wherein a plurality of cameras constitute a cluster camera.

13. A system for virtual visualization as in claim 12, wherein a cluster camera is one or more of a wide angle camera, a rectangular array, an elliptical array.

14. A system for virtual visualization as in claim 13, wherein said cluster camera is a 360 degree view camera.

15. A system for virtual visualization as in claim 6, wherein one or more of said Source Vehicles are configured to have electromagnetic field sensors to detect EM fields in a neighborhood of a flight path, and have landing gear for parking to park in the vicinity of said EM field as detected by said electro-magnetic field sensors, and inductive coupling coils which are configured to couple to the EM field to charge a vehicle battery.

16. A system for virtual visualization as in claim 15, wherein a swarm of Source vehicles communicate to share among each other, EM charging opportunities.

17. A system for virtual visualization as in claim 1, wherein the generated Aggregate Light Field is archived to generate a history of Aggregate Light Fields to construct Real Maps to enable documentaries of the past with one or both of video and static images.

18. A system for virtual visualization as in claim 1, further configured for virtual navigation of a real space:
   wherein a first field of view of one of the at least one Source of the plurality of Source Members comprises a plurality of icons representing locations of other Sources for selection of said Sources;
   wherein selection of the locations of said icons available for selection in said first field of view of one of the at least one Source of the plurality of Source Members, is the selection of the locations of their corresponding Sources;
   wherein virtual navigation of the User Member comprises changing the display of the first field of view of one of the at least one Source of the plurality of Source Members to the display of a desired second field of view of one of the at least one Source of the plurality of Source Members, which is enabled by said User Member selecting an icon of the plurality of icons displayed in said first field of view of one of the at least one Source of the plurality of Source Members wherein said selected icon is at the location of the desired one of the at least one Source of the plurality of Source Members, at the time of presence of said Source at the location of the Source Point corresponding to the second field of view;
   wherein the User Member is enabled to select a starting point at one of: a location comprising a native real environment of the User; and a menu of selection options from a choice of Sources;
   wherein upon selection of the starting point it is displayed as the first field of view, that comprises a plurality of icons that represent locations of other Sources available for selection and navigation thereto.

19. A System for Virtual Visualization as in claim 1, wherein User-Sources are User devices with Sources, wherein one or more of said Sources of User-Sources are mobile phones and are supported by their Source Members that are configured to be supported by a human user wherein said support is configured to redirect the light field incident on mirrors thereby directing it to the Source cameras while allowing the human User to view the screen of the mobile phone as a User of the Navigation system.

20. A system for virtual navigation as in claim 18, further comprising block chain nodes at each of said Sources and Users, wherein a Block Chain Transaction comprises a plurality of: a Source Start Time, a Source End Time, a Source Start Location, a Source End Location, a Summary Statistic of Data communicated from Source to User, and wherein a series of transactions generate a block chain, and wherein inspection of replicated databases of the blockchain on the nodes provides a verifiable history of virtual navigation of the User.

* * * * *